United States Patent
Jeong

(10) Patent No.: US 10,489,111 B2
(45) Date of Patent: Nov. 26, 2019

(54) SMART CONTROLLING DEVICE AND METHOD OF CONTROLLING THEREFOR

(71) Applicant: LG ELECTRONICS INC., Seoul (KR)

(72) Inventor: Gyuhyeok Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/815,491

(22) Filed: Nov. 16, 2017

(65) Prior Publication Data

US 2018/0285065 A1 Oct. 4, 2018

(30) Foreign Application Priority Data

Mar. 28, 2017 (KR) .................. 10-2017-0039299

(51) Int. Cl.
*G06F 3/16* (2006.01)
*G06N 20/00* (2019.01)
(Continued)

(52) U.S. Cl.
CPC ............ *G06F 3/167* (2013.01); *G06F 1/3265* (2013.01); *G06N 20/00* (2019.01); *G10L 15/08* (2013.01);
(Continued)

(58) Field of Classification Search
CPC ... G10L 15/28; G10L 15/32; G10L 2015/227; G10L 2015/221
See application file for complete search history.

(56) References Cited

U.S. PATENT DOCUMENTS 5,802,467 A * 9/1998 Salazar .............. H04B 10/1149
455/420
8,452,602 B1 * 5/2013 Bringert .................. G06F 3/167
704/251
(Continued)

FOREIGN PATENT DOCUMENTS

EP 2960882 12/2015
JP 2005122128 5/2005
(Continued)

OTHER PUBLICATIONS

European Patent Office Application Serial No. 17205847.1, Search Report dated Feb. 5, 2018, 10 pages.
(Continued)

*Primary Examiner* — Brian L Albertalli
(74) *Attorney, Agent, or Firm* — Lee, Hong, Degerman, Kang & Waimey PC

(57) ABSTRACT

The present specification relates to a smart controlling device capable of utilizing machine learning for voice recognition and a method of controlling therefor. The smart controlling device according to the present invention includes a receiver configured to receive an input including a command trigger, and a controller configured to detect one or more external display devices, select a display device of the detected one or more external display devices, cause a power status of the selected display device to be changed to a first state, and cause a response data corresponding to a first command data received after the command trigger to be output on a display of the selected display device.

18 Claims, 19 Drawing Sheets

(51) Int. Cl.
    *H04L 12/28*     (2006.01)
    *H04W 4/70*     (2018.01)
    *G06F 1/3234*     (2019.01)
    *G10L 15/08*     (2006.01)
    *G10L 15/22*     (2006.01)
    *G06N 3/02*     (2006.01)
    *H04W 4/33*     (2018.01)

(52) U.S. Cl.
    CPC ............ *G10L 15/22* (2013.01); *H04L 12/282* (2013.01); *H04W 4/70* (2018.02); *G06N 3/02* (2013.01); *H04W 4/33* (2018.02)

(56) References Cited

U.S. PATENT DOCUMENTS

| | | | |
|---|---|---|---|
| 9,484,021 B1 | 11/2016 | Mairesse et al. | |
| 9,749,583 B1* | 8/2017 | Fineberg | H04N 7/147 |
| 10,056,078 B1* | 8/2018 | Shepherd | G10L 15/26 |
| 2007/0233819 A1* | 10/2007 | Sato | H04N 7/17318 |
| | | | 709/219 |
| 2008/0074411 A1* | 3/2008 | Yamashita | H04N 5/63 |
| | | | 345/211 |
| 2008/0091432 A1* | 4/2008 | Dalton | G10L 15/26 |
| | | | 704/275 |
| 2008/0221877 A1* | 9/2008 | Sumita | G10L 15/22 |
| | | | 704/211 |
| 2010/0262681 A1* | 10/2010 | Chang | H04N 21/25816 |
| | | | 709/221 |
| 2013/0073293 A1* | 3/2013 | Jang | G10L 15/22 |
| | | | 704/275 |
| 2013/0169525 A1* | 7/2013 | Han | G10L 15/22 |
| | | | 345/156 |
| 2014/0188485 A1* | 7/2014 | Kim | G10L 21/00 |
| | | | 704/275 |
| 2015/0154976 A1* | 6/2015 | Mutagi | H04L 12/281 |
| | | | 704/275 |
| 2015/0213799 A1* | 7/2015 | Han | G10L 17/22 |
| | | | 704/235 |
| 2015/0331666 A1* | 11/2015 | Bucsa | G10L 15/30 |
| | | | 704/275 |
| 2015/0350353 A1* | 12/2015 | Kim | H04N 21/4122 |
| | | | 709/219 |
| 2016/0132092 A1* | 5/2016 | Joo | G06F 1/3265 |
| | | | 713/310 |
| 2016/0179462 A1* | 6/2016 | Bjorkengren | G06F 3/167 |
| | | | 704/275 |
| 2016/0225372 A1* | 8/2016 | Cheung | G10L 15/22 |
| 2016/0322047 A1 | 11/2016 | Kawashima et al. | |
| 2016/0373269 A1* | 12/2016 | Okubo | H04L 12/282 |
| 2017/0032783 A1* | 2/2017 | Lord | G10L 15/22 |
| 2017/0060530 A1* | 3/2017 | Maker, III | G10L 15/22 |
| 2017/0083285 A1* | 3/2017 | Meyers | G10L 15/063 |
| 2017/0092272 A1* | 3/2017 | Bargetzi | G10L 15/22 |
| 2017/0145432 A1* | 5/2017 | Hashimoto | A24B 15/18 |
| 2018/0122373 A1* | 5/2018 | Garner | G10L 15/22 |
| 2018/0211665 A1* | 7/2018 | Park | G10L 15/22 |

FOREIGN PATENT DOCUMENTS

| | | |
|---|---|---|
| JP | 2014017735 | 1/2014 |
| KR | 1019990040251 | 6/1999 |
| KR | 1020060099147 | 9/2006 |
| KR | 1020100066918 | 6/2010 |
| KR | 1020150089168 | 8/2015 |
| WO | 2018135803 | 7/2018 |

OTHER PUBLICATIONS

LG Electronics, "LG Expands IOT Ecosystem With Lineup of Futuristic Robotic Products", XP055444992, Jan. 2017, 6 pages.
European Patent Office Application Serial No. 17205847.1, Office Action dated Apr. 30, 2019, 4 pages.

\* cited by examiner

FIG. 11
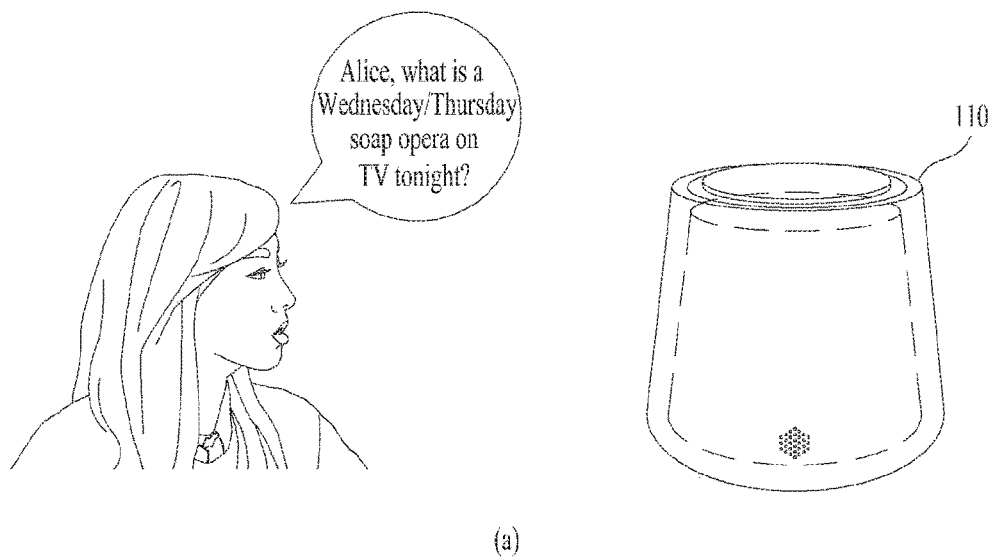
(a)
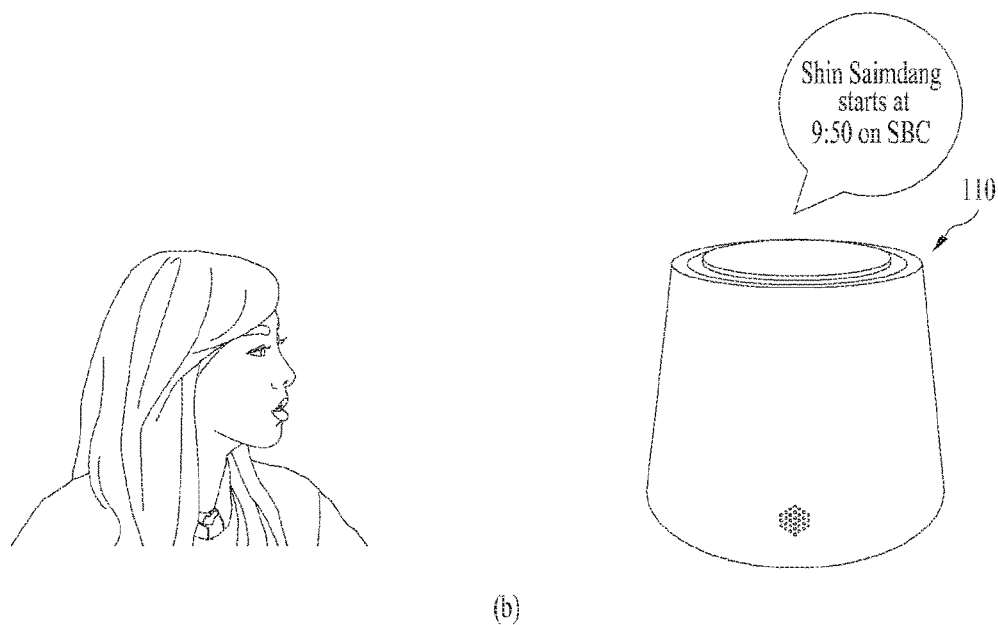
(b)

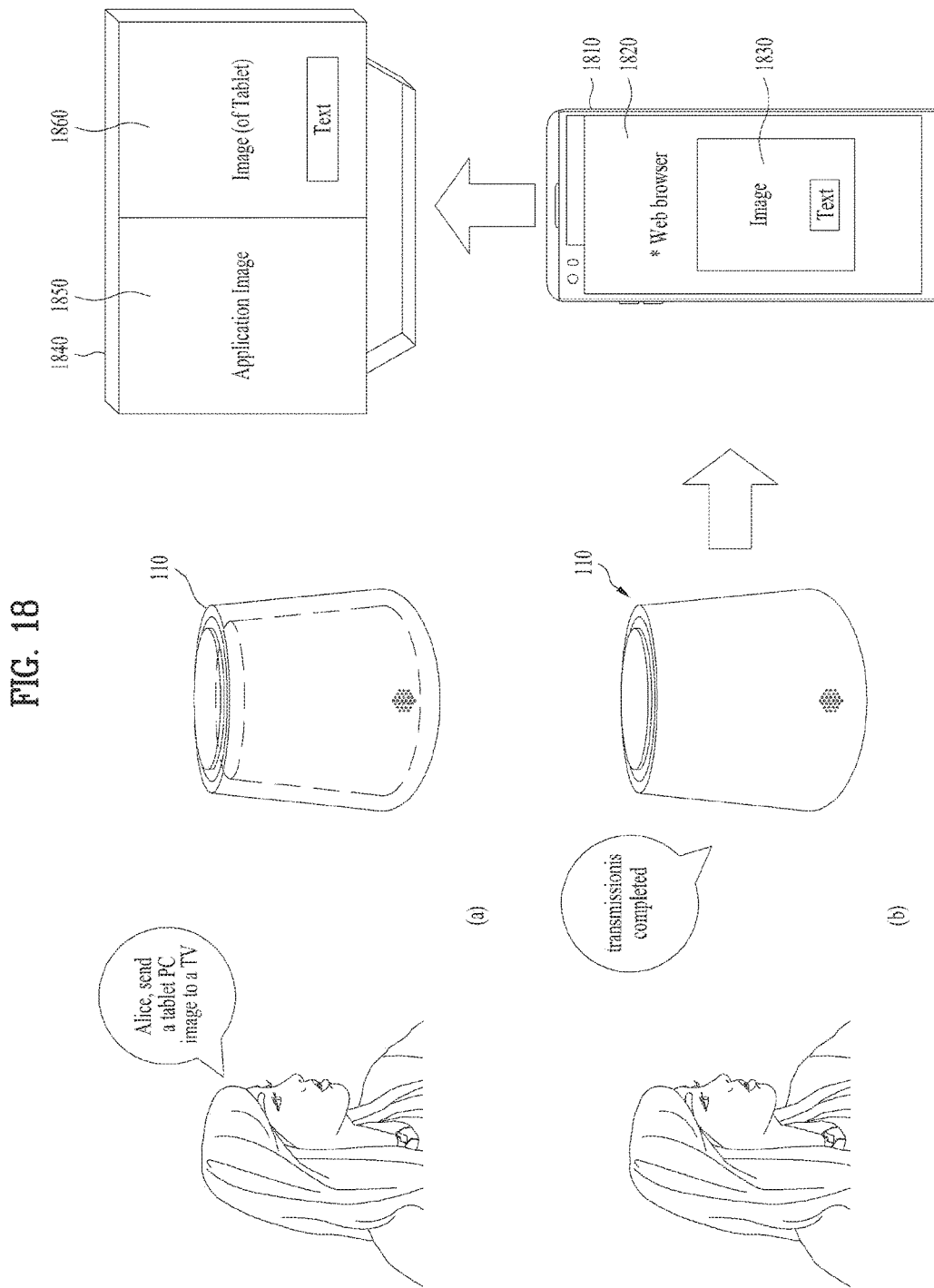

SMART CONTROLLING DEVICE AND METHOD OF CONTROLLING THEREFOR

Pursuant to 35 U.S.C. § 119(a), this application claims the benefit of earlier filing date and right of priority to Korean Patent Application No. 10-2017-0039299, filed on Mar. 28, 2017, the contents of which are hereby incorporated by reference herein in its entirety.

BACKGROUND OF THE INVENTION

Field of the Invention

The present invention relates to an audio device for processing data according to a voice recognized using machine learning and a method of controlling therefor.

Discussion of the Related Art

Generally, terminals can be classified into mobile terminals and stationary terminals according to a presence or non-presence of mobility. And, the mobile terminals may be further classified into handheld terminals and vehicle mount terminals according to the ability to hand-carry a device.

Recently, functions of a mobile terminal tend to be diversified. For instance, the diversified functions may include data and audio communication, photographing and recording a video through a camera, audio recording, music playback through a speaker system, outputting image or video through a display unit, and the like. A prescribed terminal may be further equipped with an electronic game play function or perform a multimedia player function. Particularly, mobile terminals may also be able to receive multicast signals for providing visual content such as a broadcast, a video, a television program and the like.

As functions of the terminal are becoming increasingly diversified, the terminal tends to be implemented as a multimedia player provided with complex functions such as photographing of photos or videos, playback of music or video files, game play, broadcast reception and the like for example.

To support and increase the terminal functions, improvement of structural parts and/or software parts of the terminal are considered.

Recently, audio devices capable of performing voice recognition have been developed. The audio device may be equipped with a speaker system and be able recognize voice inputs and perform a voice-related operation. The audio system may also control home appliances by communicating with the home appliances capable of communicating with the audio system. Hence, a user can conveniently execute various functions of the home appliances via voice input to the audio device.

However, since the audio device operates in accordance with an input and an output of audio data only, there is a problem of sufficiently coping with various needs or intentions of a user.

SUMMARY OF THE INVENTION

Accordingly, the present invention is directed to an apparatus and method that addresses one or more problems due to limitations and disadvantages of the related art. An object of the present invention is to provide a smart controlling device capable of recognizing an input signal, analyzing the recognized input signal, and performing an operation corresponding to the input signal.

Another object of the present invention is to provide a smart controlling device capable of easily and quickly processing an input signal, although the input signal is not restricted to voice and an output signal is not an audio signal.

The other object of the present invention is to provide a smart controlling device capable of satisfying an intention of a speaker (user) and enhancing convenience by providing the speaker with an adaptive response based on an event such as a status of the speaker, and the like using a display of a different device adjacent to the smart controlling device.

Technical tasks obtainable from the present invention are non-limited the above mentioned technical tasks. And, other unmentioned technical tasks can be clearly understood from the following description by those having ordinary skill in the technical field to which the present invention pertains.

A smart controlling device capable of performing voice recognition and a method of controlling therefor are disclosed in the present specification.

To achieve these objects and other advantages and in accordance with the purpose of the invention, as embodied and broadly described herein, according to one embodiment, a smart controlling device includes a receiver configured to receive an input comprising a command trigger, and a controller configured to detect one or more external display devices; select a display device of the detected one or more external display devices; cause a power status of the selected display device to be changed to a first state; and cause a response data corresponding to a first command data received after the command trigger to be output on a display of the selected display device.To further achieve these objects and other advantages and in accordance with the purpose of the invention, as embodied and broadly described herein, according to a different embodiment, a method of controlling a smart controlling device includes receiving an input comprising a command trigger; detecting one or more external display devices; selecting a display device of the detected one or more external display devices; changing a power status of the selected display device to a first state; and outputting response data corresponding to a first command data received after the command trigger on a display of the selected display device.

A computer-readable medium for controlling a smart controlling device is provided. The computer-readable medium may include computer executable code. The computer-readable medium may include code for receiving an input comprising a command trigger; detecting a location of a source of the received input; detecting one or more external display devices based on the detected location; selecting a display device from the detected one or more external display devices; transmitting a control command to change a power status of the selected display device to a stand-by status; generating response data corresponding to command data received after the command trigger; and transmitting a control command for switching a power status of the selected display device to a power-on status and displaying the generated response data via a display of the selected display device when it is determined that the generated response data is required to be displayed on a display.

Technical solutions obtainable from the present invention are non-limited the above mentioned technical solutions. And, other unmentioned technical solutions can be clearly understood from the following description by those having ordinary skill in the technical field to which the present invention pertains.

According to at least one of various embodiments of the present disclosure, it is able to cope with an input signal by recognizing the input signal and analyzing the recognized input signal.

According to at least one of various embodiments of the present disclosure, it is able to easily and quickly process an input signal, although the input signal is not restricted to voice and an output signal is not an audio signal.

According to at least one of various embodiments of the present disclosure, it is able to satisfy an intention of a speaker (user) and enhance convenience by providing the speaker with an adaptive response based on an event such as a status of the speaker, and the like using a display of a different adjacent device.

Effects obtainable from the present disclosuremay be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 11, 12, 13, and 14 are diagrams for explaining various scenarios of using a smart controlling device according to the present disclosure;

FIG. 18 is a diagram for explaining a scenario including image information of a smart controlling device according to the present disclosure.

DETAILED DESCRIPTION OF THE INVENTION

Figure 1:
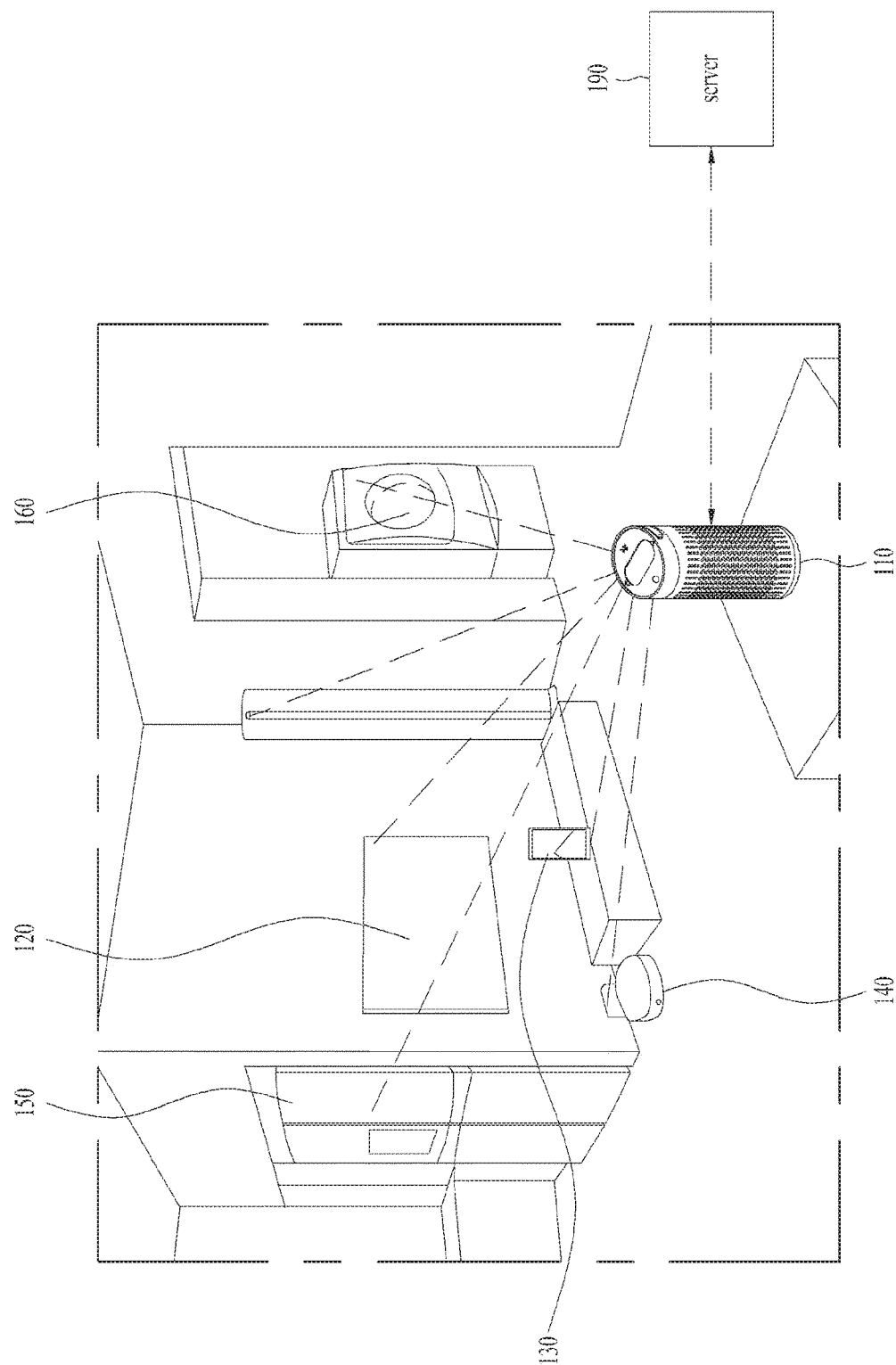
FIG. 1 is a schematic diagram for a digital system including a smart controlling device according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Such a terminology as a smart controlling device described herein corresponds to a terminology including all devices configured to perform an output operation or a prescribed operation by transmitting data to at least one or more devices, which are connected or capable of being connected based on various inputs including voice, a text, an image, a motion, and the like. The smart controlling device may correspond to all electronic devices equipped with an artificial intelligence (hereinafter, AI) functionality and/or a voice recognition functionality. For example, an audio device configured to control an operation of a prescribed device by transmitting a control command to the prescribed device according to a voice command inputted by a user can also be included in the smart controlling device. For the understanding of the present invention and for clarity, the present specification is explained with an example of an audio device (smart speaker) equipped with AI functionality and the audio device capable of recognizing voice, by which the present invention may be non-limited.

FIG. 1 is a schematic diagram for a digital system including a smart controlling device according to the present invention.

For clarity, FIG. 1 shows an example of a digital system including various devices including a smart controlling device 110 which is connected or capable of being connected via a home network. The smart controlling device 110 can perform data communication with at least one or more external devices via short distance or long distance wired/wireless communication to control the at least one or more external devices based on the data communication. For instance, the smart controlling device 110 can perform a function of a controller in the digital system shown in FIG. 1. Meanwhile, as shown in FIG. 1, the smart controlling device 110 can perform data communication with an external server 190. In this case, the data communication can be performed not only with the smart controlling device 110 but also with a different device. In this case, the smart controlling device 110 can indirectly perform data communication with the external server 190 via the different device. The data communication performed with the external server or the digital system shown in FIG. 1 can be performed based on a communication protocol such as WiFi (Wireless-Fidelity), Bluetooth™, Z-wave, Infrared communication, Zigbee, RS, and the like. The present invention is not limited to the aforementioned communication protocols. Meanwhile, the data communication can be directly performed between devices or can be indirectly performed via such a device as a relay, a gap filler, or the like.

For clarity, FIG. 1 shows an example that the smart controlling device 110 and other devices 120, 130, 140, 150, 160 included in the digital system belong to the same network. Yet, it is not mandatory that the smart controlling device 110 and other devices belong to the same network. Meanwhile, referring to FIG. 1, such electronic devices as a digital TV 120, a smartphone 130, an electronic or robot cleaner 140, a refrigerator 150, a washer 160, and the like are illustrated as other devices. Yet, the present invention is not restricted by the above electronic devices.

In relation to this, as an example of controlling external devices according to the present invention, the smart controlling device 110 can turn on the power of an air conditioner or control a temperature of the air conditioner. In particular, the smart controlling device 110 can play a role of a controller configured to control external devices within an IoT (Internet of Things) environment.

Figure 2:
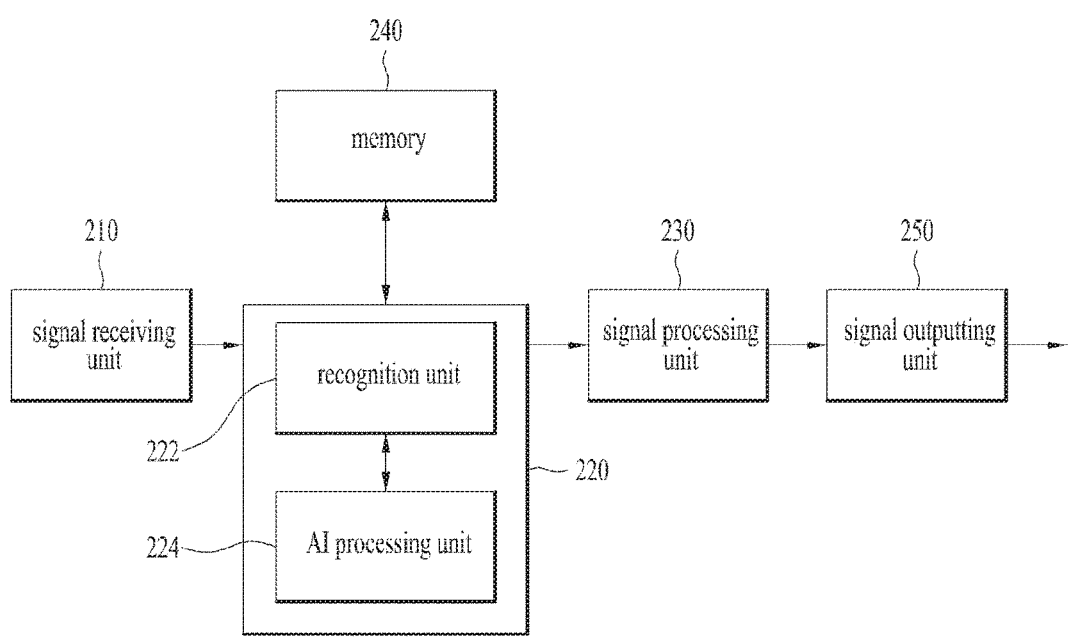
FIG. 2 is a block diagram for a smart controlling device according to one embodiment of the present disclosure.
Figure 3:
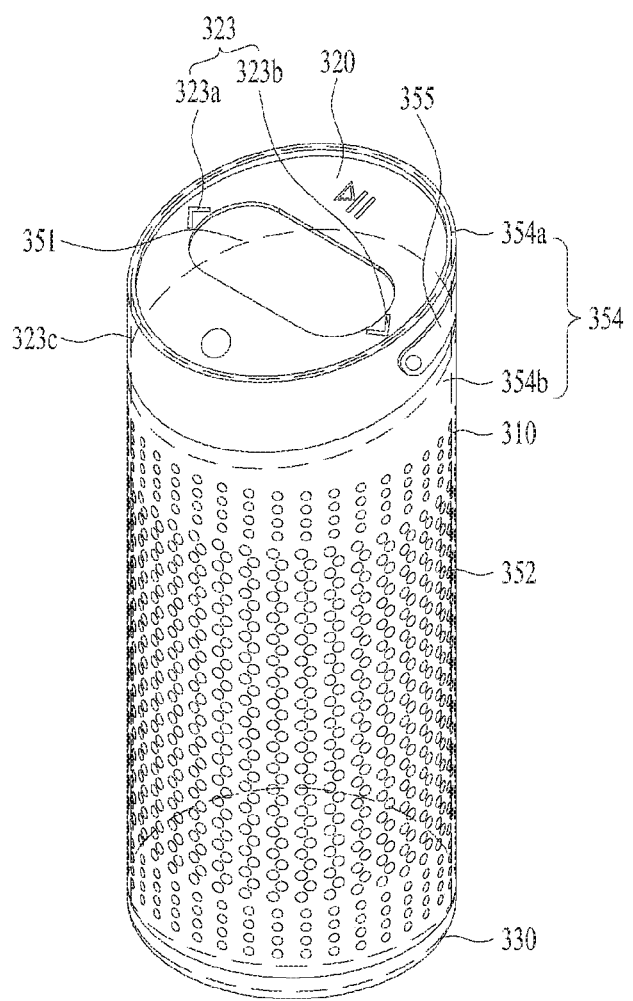
FIG. 3 is a diagram for explaining an exterior of a smart controlling device according to one embodiment of the present disclosure.

FIG. 2 is a block diagram for a smart controlling device and FIG. 3 is a diagram for explaining an exterior of the smart controlling device according to one embodiment of the present invention.

According to one embodiment of the present invention, the smart controlling device includes a signal receiving unit configured to receive an input signal including a command trigger and a first command data and a controller configured to detect and select a display device upon the reception of the command trigger. The controller may also be configured to control display of a power state of the selected display device to be changed to a first state, as well as to control a response data to be outputted on a display of the display device, which is switched to the first state, in response to the first command data.

The smart controlling device 110 may include a signal receiving unit 210, a controller 220, a signal processing unit 230, a memory 240, a signal outputting unit 250, and the like. In this case, the controller 220 can include a recognition unit 222, an AI processing unit 224, and the like. In some embodiments, the recognition unit 222 and the AI processing unit 224 can be separately configured apart from the controller 220, or they may be implemented in a single configuration. Further, the recognition unit 222 and the AI processing unit 224 may be singularly implemented together in some embodiments and in other embodiments they may be separately configured, as discussed below and depicted in FIG. 2 for example.

In an embodiment, the signal receiving unit 210 may receive a voice command of a user via a microphone of the terminal (not depicted). In this case, for example, the voice command can be divided into such a start signal as "Alice" and an operation signal such as a command, a request, and the like apart from the start signal. In this discussion, the start signal can be variously referred to as a start data, a voice command trigger signal, a command trigger, a voice command trigger data, a trigger signal, a trigger data, or the like. For clarity, the start signal is commonly referred to as "command trigger." Unless it is specifically mentioned, the terms signal and data may be understood to refer to the same information.

Meanwhile, data of an input signal apart from the command trigger is referred to as a command data. For example, the command data corresponds to an actual command spoken by a speaker (a user). The signal receiving unit 210 is configured to transmit the received voice command to the controller 220. In this case, the command trigger can be excluded from the transmitted voice command. In some cases, when the command trigger is not inputted by a user, the signal receiving unit 210 may ignore any received signals or may not transmit the signal to the controller 220. Although an embodiment involving voice commands is discussed, the present disclosure is not limited to this. In particular, the signal receiving unit 210 may receive various signals including a text, a motion, a touch, and the like. To this end, the signal receiving unit can include an interface therefor.

As mentioned in the foregoing description, an embodiment of the controller 220 may include the recognizing unit 222, the AI processing unit 224, and the like. The recognizing unit 222 may recognize command trigger and command data included in an input signal received from the signal receiving unit 210 according to a format of the input signal. For example, if the input signal received via the signal receiving unit 210 is a voice input, the recognizing unit 222 recognizes the input signal using hardware or software such as a voice recognition function, a tool, a module, an engine, or the like. In this case, the recognizing unit 222 converts the voice input signal into a text format based on STT (Sound to Text) (in some cases, TTS (Text to Sound)) and provides the text format to the AI processing unit 224 to analyze the input signal. The AI processing unit 224 analyzes the input signal data provided by the recognizing unit 222. For example, if a command trigger included in the received input signal, the recognizing unit 222 or the AI processing unit 224 can detect, select, and control an associated display device according to the command data input with the command trigger. The AI processing unit 224 may analyze the input signal recognized by the recognizing unit 222 and generate response data. In the foregoing description, for example, the AI processing unit 224 or the controller 220 may be configured to determine whether or not the input signal is valid, determine an attribute of a trigger or command data, determine a type of the trigger or command data, and the like.

The AI processing unit may include one or more modules configured to perform machine learning, information inference, information perception, natural language processing, and the like.

The AI processing unit 224 may perform machine learning, inference, and processing of a vast amount of information (Big data) such as information stored in the smart controlling device 110, such as in memory 240, information on environment surrounding the smart controlling device 110, information stored in an external storage capable of performing communication, and the like using machine learning technology. The AI processing unit 224 may predict executable operations of at least one or more terminals based on the information learned by machine learning and may be able to control a terminal to execute an operation determined to be most appropriate among the predicted operations.

Machine learning may include collecting and learning a vast amount of information based on at least one or more algorithms and determining and predicting information based on the learned information. The machine learning may correspond to operations of identifying a characteristic, a rule, a criterion, and the like based on the information, quantifying a relation between information, and predicting new data using a quantified pattern.

Algorithms used by the machine learning technology may be based on statistics. For example, the algorithms may include a decision tree using a tree structure as a prediction model, a neural network imitating a neural network structure and function of a creature, genetic programming based on an evolution algorithm of a creature, clustering for distributing examined examples by such a subset as a cluster, Monte carlo method for calculating a function value with probability via a randomly selected random number, and the like.

As a branch of machine learning technology, a deep learning technology corresponds to a technology that performs learning, determining, or processing information using an artificial neural network algorithm. The artificial neural network connects layers with each other and may have a structure of forwarding data between layers. The deep learning technology can learn a vast amount of information via the artificial neural network using a GPU (graphic processing unit) optimized for parallel arithmetic.

Meanwhile, in order to collect a vast amount of information to which the machine learning technology is applied, the AI processing unit 224 can collect (sense, monitor, extract, detect, receive) signals, data, information, and the like inputted or outputted to/from configuration elements of the smart controlling device 110. And, the AI processing unit 224 can collect (sense, monitor, extract, detect, receive) data, information, and the like stored in an external storage (e.g., cloud server) connected with the AI processing unit via communication, or stored in local memory, such as memory 240. More specifically, the information collecting may include operations of sensing information through a sensor, extracting information from the memory 240, or receiving information from the external storage via communication.

In some embodiments, the AI processing unit 224 can sense information stored in the smart controlling device 110, information on environment surrounding the smart controlling device 110, or user information received through a sensor (not depicted). And, the AI processing unit 224 can receive a broadcast signal and/or broadcast-related information, a radio signal, a radio data, and the like via a radio communication unit (not depicted). And, the AI processing unit 224 can receive video information (or signal), audio information (or signal), data, or information inputted by a user from an input unit.

The AI processing unit 224 may collect a vast amount of information in the background in real time, perform learning or training based on the collected the information, and store the information in the memory 240 in a manner of processing the information in an appropriate form (e.g., knowledge graph, command policy, personalized database, conversation engine, etc.).

If an operation of a terminal is predicted based on the information learned using the machine learning technology, the AI processing unit 224 may control the configuration elements of the terminal or deliver a control command for executing the predicted operation to the controller 220 to execute the predicted operation.

Meanwhile, if a specific operation is performed, the AI processing unit 224 analyzes history information indicating the performance of the specific operation via the machine learning technology and may be able to update previously learned information based on the analyzed information. By doing so, the AI processing unit 224 can enhance accuracy of information prediction.

In some embodiments, the recognition unit 222 and/or the AI processing unit 224 and the controller 220 can be implemented in the same configuration element. In this case, a function performed by the controller 220 described in the present specification can be expressed as being performed by the recognizing unit 222 and/or the AI processing unit 224, and vice versa.

On the contrary, in other embodimetns, the recognition unit 222 and/or the AI processing unit 224 and/or the controller 220 may be implemented as separate configuration elements. In this case, the recognition unit 222 and/or the AI processing unit 224 may exchange data with the controller 220 to perform various controls in the smart controlling device 110. The controller 220 can perform at least one or more functions in a terminal or control at least one or more configuration elements of the terminal based on a result determined by the AI processing unit 224. Moreover, the AI processing unit 224 may operate under the control of the controller 220.

The memory 240 may store data necessary for analyzing received information and processing the information. The memory stores data supporting various functions of the smart controlling device 110. The memory 240 can store a plurality of application programs (applications) operating at the smart controlling device 110, data for operations of the smart controlling device 110, commands, data (e.g., including machine learning data) for operations of the AI processing unit 224, and the like. The applications may be downloaded from an external server via wired or wireless communication. Meanwhile, an application may be stored in the memory 240 and installed at the smart controlling device 110 to enable the controller 220 perform operations or functions of the smart controlling device 110.

The signal processing unit 230 generates a signal according to the control of the controller 220. For example, the generated signal may include the aforementioned control command. Besides, the signal processing unit 230 can process various data necessary for the smart controlling device 110.

The signal outputting unit 250 transmits a signal processed by the signal processing unit 230 to an internal or an external device according to a prescribed output scheme. In this case, the output scheme can be determined or differentiated according to a communication protocol, a target device, a type of an output signal, and the like.

Although it is not depicted, if necessary, the smart controlling device 110 can further include a communication interface, or the like, necessary for transmitting and receiving a signal/data.

Meanwhile, referring to FIG. 3, the smart controlling device 100 can include a user input unit 323, a sound outputting unit 352, and a first light outputting unit 354 at an outer side of a body. The user input unit 323 can be configured to receive a control command from a user and in some embodiments, the user input unit 323 may include a plurality of user input units at the smart controlling device. One embodiment may include a first user input unit 323a, a second user input unit 323b, and a third user input unit 323c. Similarly, a plurality of light outputting units can be installed in the smart controlling device. In one embodiment, the plurality of the light outputting units may include a first light outputting unit 354a and a second light outputting unit 354b. For the purposes of this discussion, the plurality of the user input units and the plurality of the light outputting units may be collectively referred to as reference characters 323 and 354, respectively.

The body of one embodiment may have a cylindrical shape and have a function of a speaker. A size of the body can be determined in consideration of design of the body unit. However, a shape of the body unit can be changed in various ways in other embodiments.

The body can include a first region 310 forming a side of a cylinder, a second region 320 forming a top side of the cylinder, and a third region 330 forming a bottom side of the cylinder. The second region 320 and the third region 330 may or may not have the same area.

The first region 310 can also be referred to as an outer side. The second region 320 and the third region 330 can also be referred to as an outer upper side and an outer bottom side, respectively. Yet, in the following, such terminologies as the first, the second, and third region are used.

The first region 310 can be equipped with a third user input unit 323c, a second light outputting unit 354b, an infrared outputting unit 355, and a sound outputting unit 352. For example, the second light outputting unit 354b and the sound outputting unit 352 can be formed in a manner of being apart from each other. Or, at least a part of the second light outputting unit 354b and the sound outputting unit 352 may form a layered structure to make the second light outputting unit 354b and the sound outputting unit 352 to be overlapped with each other.

The second light outputting unit 354b and the sound outputting unit 352 can be configured to surround the first region 310 or be positioned at the first region 310 of the body. Hence, the sound outputting unit 352 may be configured to output sound in all directions from the body and the second light outputting unit 354b can output light in all directions from the body.

The third user input unit 323c can be deployed at the top of the first region 310. The third user input unit 323c can be configured to rotate around the center of the cylindrical body. In one example, a user may rotate the third user input unit 323c to increase or decrease the volume of the smart controlling device 110.

The infrared outputting unit 355 can be at a location capable of outputting an infrared signal in all directions. For example, the infrared outputting unit may be positioned at the top of the first region 310. In another example, the infrared outputting unit may be positioned at a region configured to rotate at the top of the first region 310. Hence, the infrared outputting unit 355 may be able to output an infrared signal to an external device located at a random position with respect to the body. In other embodiments, various other locations of the infrared outputting unit around all positions on the body are considered.

The second region 320 can be equipped with a display unit 351, first and second user input units 323a/323b, a first light outputting unit 354a, and a temperature/humidity sensor (not depicted).

The display unit 351 may be positioned at the center of the second region 320. The first and the second user input units 323a/323b may be positioned at regions adjacent to the display unit 351 to receive a user input.

The first and second user input units 323a/323b may correspond to physical or touch sensitive buttons. The first user input unit and the second user input unit can be configured to perform different functions. For example, the first user input unit 323a may correspond to a button for terminating voice recognition and the second user input unit 323b may correspond to a button for turning on/off power.

The first light outputting unit 354a can be configured along an outer edge of the second region 320. For example, if the second region 320 corresponds to a circular shape, the first light outputting unit 354a may be configurd as a ring around the edge of the second region.

The light outputting unit 354 includes one or more light sources to emit light. As an example of the light source, it may use an LED (light emitted diode). The light source is located at the inner peripheral surface of the light outputting unit 354 and light emitted from the light source passes through the light outputting unit 354 and emits light. The light outputting unit 354 may include a transparent or translucent material.

The light outputting unit 354 can output light notification information related to an event at the smart controlling device 110. For example, if the smart controlling device 110 performs voice recognition, the light outputting unit 354 can output a red light. If the smart controlling device 110 is waiting for a modification command, the light outputting unit 354 can output a yellow light.

The temperature/humidity sensor can be positioned at the second region 320 to sense an external temperature and humidity.

Although it is not depicted, the third region 330 can be further equipped with a power supply unit for receiving power, an interface for transceiving data with an external device, such as a netowock interface, an audio input unit (microphone) for receiving sound, and the like.

In the following, embodiments of a terminal performing data communication with the smart controlling device 110 will be discussed. Examples of the terminal include a fixed device such as a network television, a HBBTV (hybrid broadcast broadband TV), a smart TV, an IPTV (internet protocol TV), a PC (personal computer), or the like. Meanwhile, the terminal may also include a display panel only. In other embodiments, the terminal can be implemented using various configurations and/or combinations (e.g., a display combined with a STB (set-top box)).

The terminal may use a general-purpose OS (operating system), such as "Web OS", and the like. The terminal can add, delete, modify, and update various services or an application to a general-purpose OS kernel, such as a Linux kernel, and the like. By doing so, it may be able to provide a more user-friendly environment to a user.

Figure 4A:
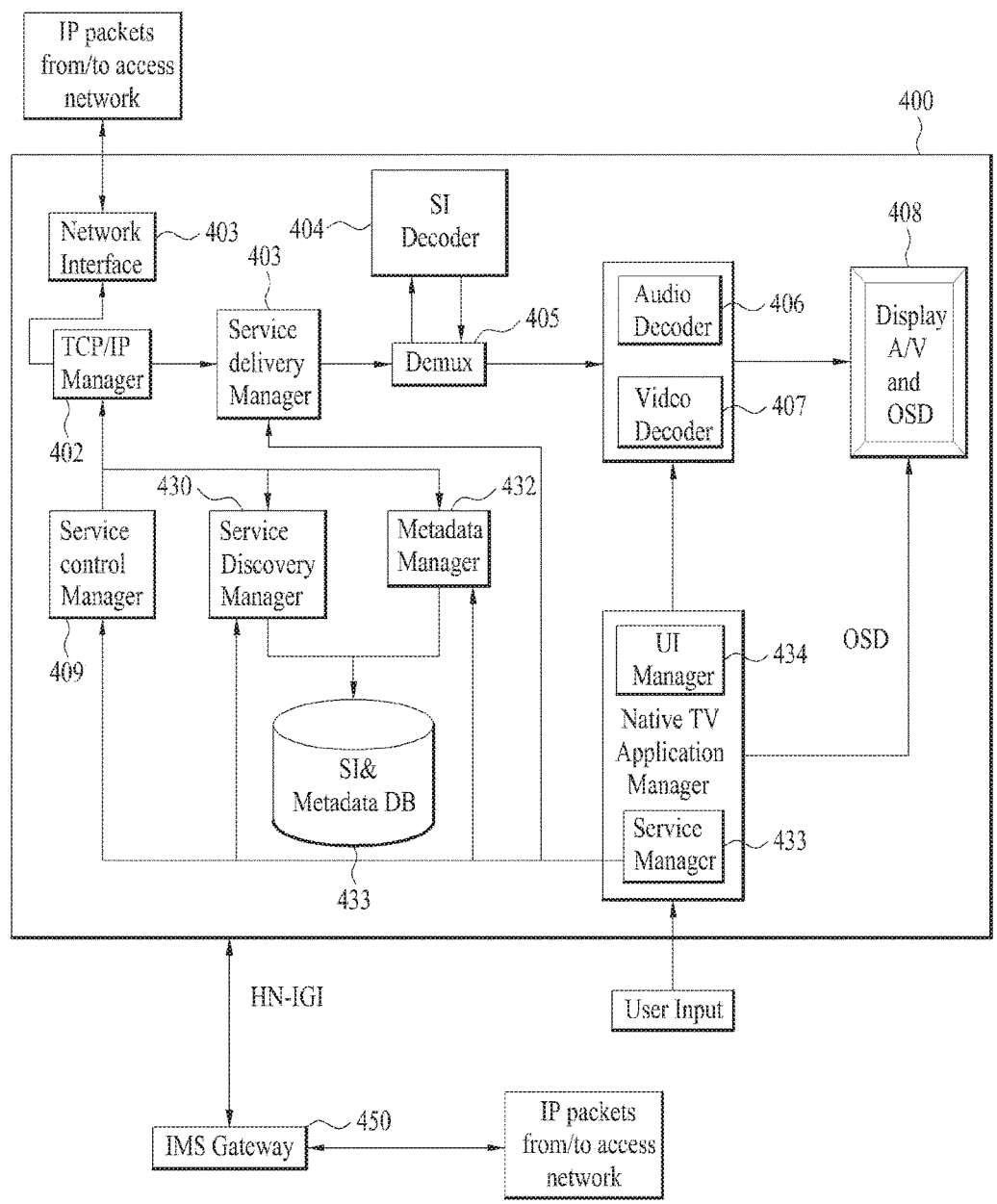
FIG. 4A is a block diagram for a configuration of a digital TV according to one embodiment of the present disclosure.
Figure 4B:
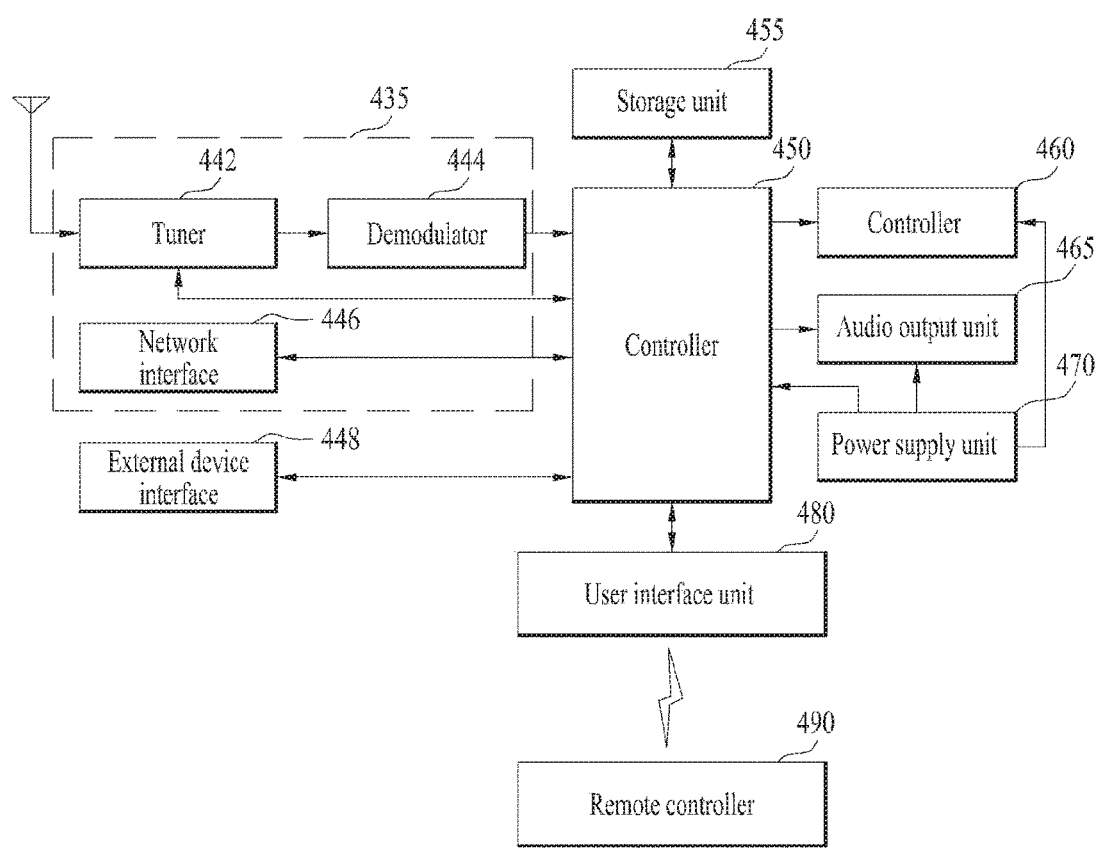
FIG. 4B is a block diagram for a configuration of a digital TV according to a different embodiment of the present disclosure.
Figure 5:
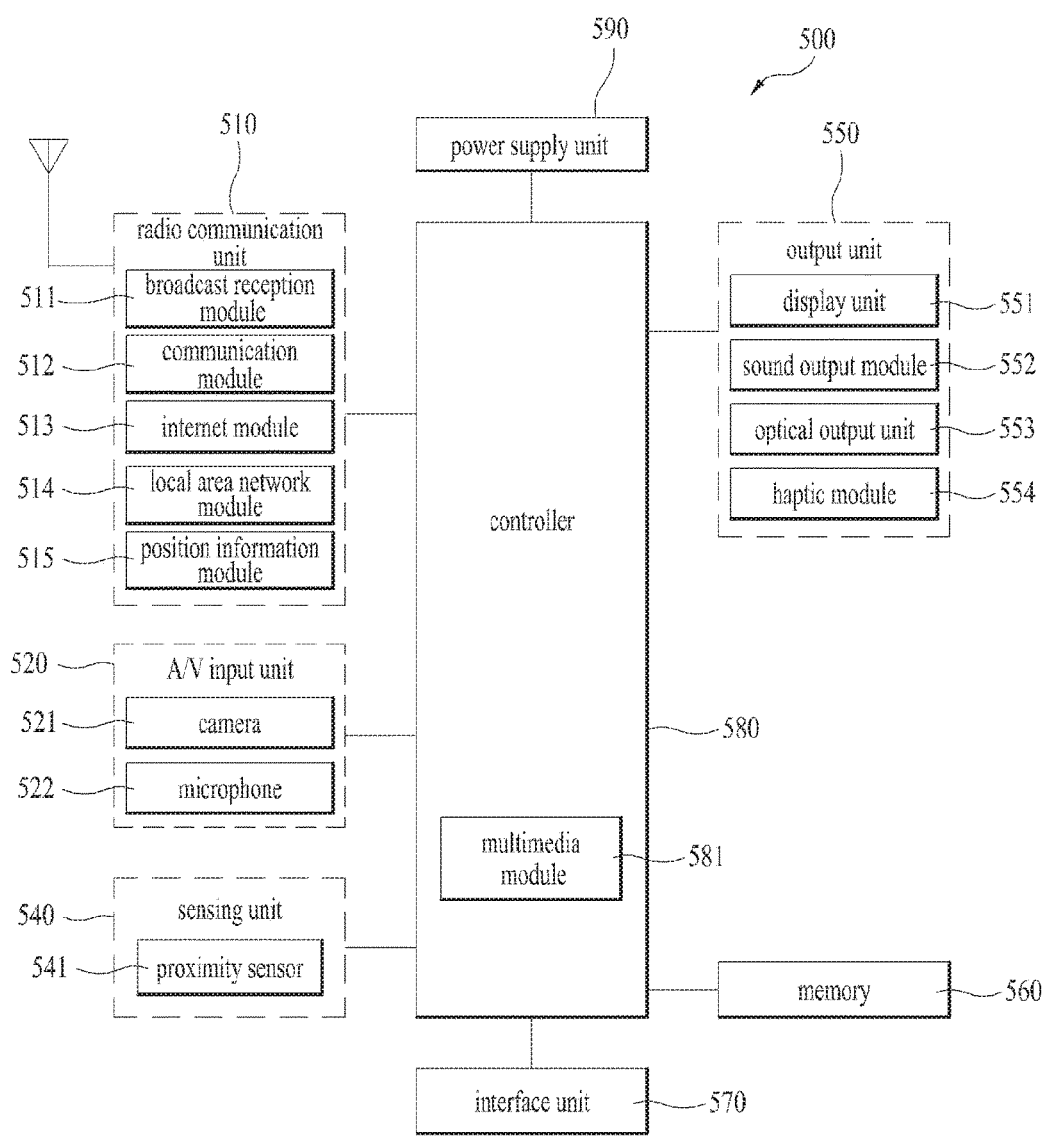
FIG. 5 is a block diagram for a configuration of a mobile terminal according to one embodiment of the present disclosure.

The terminal can also be referred to as a display device and the disclosure considers all embodiments including any terminal device equipped with a display. FIG. 4A, FIG. 4B show a digital TV as an example of the display device and FIG. 5 shows a mobile terminal as a different example of the display device. Yet, as mentioned in the foregoing description, the terminal may correspond to any devices equipped with a display without being restricted to the examples shown in FIGS. 4A, FIG. 4B and 5.

FIG. 4A is a block diagram for a configuration of a digital TV according to one embodiment of the present invention.

A digital TV 400 can include a network interface unit 401, a TCP/IP manager 402, a service delivery manager 403, an SI decoder 404, a demuxer or demultiplexer 405, an audio decoder 406, a video decoder 407, a display unit (display A/V and OSD module) 408, a service control manager 409, a service discovery manager 410, an SI & metadata DB 411, a metadata manager 412, a service manager 413, a UI (user interface) manager 414, and the like.

The network interface unit 401 transceives IP packets (Internet Protocol packets) or IP datagram(s) (hereinafter, "IP packet(s)") with a server 405. For example, the network interface unit 401 can receive a service, an application, contents, etc. from a service provider via a network.

The TCP/IP manager 402 is involved in delivering packets received or transmitted by the digital TV 400. In particular, the Transmission Control Protocol/Internet Protocol (TCP/IP) manager 402 is involved in delivering a packet between a source and a destination. The TCP/IP manager 402 classifies received packet(s) to make the packet(s) correspond to an appropriate protocol and outputs the classified packet(s) to the service delivery manager 403, the service discovery manager 410, the service control manager 409, the metadata manager 412, and the like.

The service delivery manager 403 is in charge of controlling a received service data. For example, in case of controlling real-time streaming data, the service delivery manager 403 can use Real-time Transport Protocol/RTP Control Protocol (RTP/RTCP). In case of transmitting the real-time streaming data using RTP, the service delivery manager 403 parses the received data packet according to the RTP and transmits the parsed data packet to the demultiplexer 405 or stores the parsed data packet in the System Information/Service Information/Signaling Information (SI) & metadata database (DB) 411 according to the control of the service manager 413. Subsequently, the service delivery manager 403 feeds back the information received from a network to a service providing server using RTCP.

The demultiplexer 405 demultiplexes a received packet into audio, video, SI data, or the like and transmits it to the audio/video decoder 406/407 and the SI decoder 404.

The SI decoder 404 decodes demultiplexed SI data such as service information including PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), and the like. The SI decoder 404 can store decoded service information in the SI & metadata DB 411. For example, the stored service information can be used in a manner of being read and outputted by a corresponding configuration according to a request of a user.

The audio/video decoder 406/407 decodes demultiplexed audio data and demultiplexed video data, respectively. The decoded audio data and the decoded video data are provided to a user via the display unit 408.

An application manager, for example, includes a UI manager 414 and a service manager 413 and can perform a function of a control unit of the digital TV 400. The application manager manages the overall state of the digital TV 400, provides a user interface (UI), and manages a different manager.

The UI manager 414 provides GUI (Graphic User Interface)/UI to a user using OSD (On Screen Display), receives a key input from the user, and performs a device operation according to the input. For example, if the UI manager 414 receives a key input for selecting a channel from a user, the UI manager transmits the key input signal to the service manager 413.

The service manager 413 controls managers related to a service such as the service delivery manager 403, the service discovery manager 410, the service control manager 409, the metadata manager 412, and the like. The service manager 413 generates a channel map and controls channel selection and the like using the generated channel map according to the key input received from the UI manager 414. The service manager 413 sets an audio/video PID (Packet identifier) of a channel, which is selected by receiving service information from the SI decoder 404, to the demultiplexer 405. The PID can be used for the aforementioned de-multiplexing procedure. The demultiplexer 405 filters audio data, video data, and SI data using the PID.

The service discovery manager 410 provides a user with information necessary for selecting a service provider providing a service. If a signal for selecting a channel is received from the service manager 413, the service discovery manager 410 discovers a service using the information.

The service control manager is in charge of selecting and controlling a service. For example, if a user selects a live broadcasting service similar to a legacy broadcasting scheme, the service control manager 409 may use IGMP (Internet Group Management Protocol) or RTSP. If the user selects such a service as VOD (Video on Demand), the service control manager selects and controls the service using RTSP. The RTSP protocol can provide a trick mode to real-time streaming. The service control manager 409 can initiate and manage a session via an IMS gateway 430 using IMS (IP Multimedia Subsystem), SIP (Session Initiation Protocol). The aforementioned protocols are just an embodiment. Depending on an implementation example, it may be able to use a different protocol.

The metadata manager 412 manages a metadata associated with a service and stores the metadata in the SI & metadata DB 411.

The SI & metadata DB 411 stores information necessary for selecting service information decoded by the SI decoder 404, metadata managed by the metadata manager 412, and a service provider provided by the service discovery manager 410. The SI & metadata DB 411 can store set-up data for a system, and the like. The SI & metadata DB 411 can be implemented using a non-volatile RAM (NVRAM), a flash memory, and the like.

Meanwhile, the IMS gateway 430 corresponds to a gateway including functions necessary for accessing an IMS-based IPTV service.

FIG. 4B is a block diagram for a configuration of a digital TV according to a different embodiment of the present invention.

Referring to FIG. 4B, a digital TV 400 can include a broadcast receiving unit 435, an external device interface unit 448, a storing unit 455, a user interface unit 480, a control unit 450, a display unit 460, an audio output unit 465, a power supply unit 470, and a capturing unit (not depicted). In this case, the broadcast receiving unit 435 can include at least one tuner 442, a demodulating unit 444, and a network interface unit 446. In some cases, the broadcast receiving unit 435 may include the tuner 442 and the demodulating unit 444 only except the network interface unit 446, or vice versa. Although it is not depicted, the broadcast receiving unit 435 may include a multiplexer to multiplex a signal demodulated by the demodulating unit 444 via the tuner 442 with a signal received through the network interface unit 446. Besides, although it is not depicted as well, the broadcast receiving unit 435 may include a demultiplexer to de-multiplex the multiplexed signal, the demodulated signal, or the signal went through the network interface unit 446.

The tuner 442 receives an RF (Radio Frequency) broadcasting signal by tuning a channel selected by a user or all channels stored in advance among RF broadcasting signals received via an antenna. The tuner 442 converts the received RF broadcasting signal into an IF (Intermediate Frequency) signal or a baseband signal. For example, if the received RF broadcasting signal corresponds to a digital broadcasting signal, the RF broadcasting signal is converted into a digital IF signal (DIF). If the received RF broadcasting signal corresponds to an analog broadcasting signal, the RF broadcasting signal is converted into an analog baseband image or an audio signal (CVBS/SIF). In particular, the tuner 442 can process both a digital broadcasting signal and an analog broadcasting signal. The analog baseband image or the audio signal (CVBS/SIF) outputted from the tuner 442 can be directly inputted to the control unit 450. The tuner 442 can receive an RF broadcasting signal of a single carrier or multiple carriers. Meanwhile, the tuner 442 sequentially tunes and receives RF broadcasting signals of all broadcasting channels, which are stored via a channel remember function, among RF broadcasting signals received via an antenna and may be able to converts the received RF broadcasting signals into a DIF (Digital Intermediate Frequency or baseband signal).

The demodulating unit 444 receives the digital IF signal (DIF) converted by the tuner 442, demodulates the signal, and performs channel decoding. To this end, the demodulating unit 444 can be equipped with a Trellis decoder, a de-interleaver, a Reed-Solomon decoder, a convolution decoder, a de-interleaver, a Reed-Solomon decoder, or the like. The demodulating unit 444 performs demodulation and channel decoding and may be then able to output a stream signal (TS (transport stream)). In this case, the stream signal may correspond to a signal that a video signal, an audio signal, and a data signal are multiplexed. For example, the stream signal may correspond to MPEG-2 TS that a video signal of MPEG-2 standard and an audio signal of Dolby AC-3 standard are multiplexed. The stream signal outputted from the demodulating unit 444 can be inputted to the control unit 450. The control unit 450 controls de-multiplexing, video/audio signal processing, and the like, controls an image to be outputted via the display unit 460, and controls audio to be outputted via the audio output unit 465.

The external device interface unit 448 provides interfacing environment between the digital TV 400 and various external devices. To this end, the external device interface unit 448 can include an A/V input/output unit (not depicted) or a wireless communication unit (not depicted). The external device interface unit 448 can be connected with an external device such as a DVD (Digital Versatile Disk), a Blu-ray, a gaming device, a camera, a camcorder, a computer (notebook), a tablet PC, a smartphone, a Bluetooth device, a cloud, and the like in wired/wireless. The external device interface unit 448 delivers a signal including data such as an image, a video, audio, and the like inputted via an external device connected with the external device interface unit to the control unit 450 of the digital TV 400. The control unit 450 can control a data signal including a processed image, a video, audio, and the like to be outputted to the connected external device. To this end, the external device interface unit 448 can further include an A/V input/output unit (not depicted) or a wireless communication unit (not depicted).

The A/V input/output unit can include a USB terminal, a CVBS terminal, a component terminal, an S-video terminal (analog), a DVI terminal, a HDMI terminal, an RGB terminal, a D-SUB terminal, and the like to input an image signal and an audio signal of an external device to the digital TV 400.

The wireless communication unit can perform short range wireless communication with a different digital device. For example, the digital TV 400 can be connected with a different digital device according to a communication protocol such as Bluetooth, RFID, infrared communication (IrDA), UWB, Zigbee, DLNA, or the like.

The external device interface unit 448 is connected with a set-top box (STB) via at least one of the aforementioned terminals and performs an input/output operation with the set-top box (STB). Meanwhile, the external device interface unit 448 receives an application or a list of applications of an external device adjacent to the external device interface unit and delivers the application or the list of applications to the control unit 450 or the storing unit 455.

The network interface unit 446 provides an interface to connect the digital TV 400 with a wired/wireless network including the Internet. In order to connect the digital TV with a wired network, for example, the network interface unit 446 can include an Ethernet terminal. In order to connect the digital TV with a wireless network, for example, the network interface unit 446 may use WLAN, Wibro, Wimax, HSDPA communication standard, or the like. The network interface unit 446 can transceive a data with a different user or a different digital device via a connected network or a different network linked with the connected network. In particular, partial content data stored in the digital TV can be transmitted to a user or a digital device selected from users or digital devices registered at the digital device in advance. Meanwhile, the network interface unit 446 can access a prescribed web page via a connected network or a different network linked with the connected network. In particular, the network interface unit accesses a prescribed web page via a network and may be able to transmit or receive a data with a corresponding server. Besides, the network interface unit can receive contents or data provided by a content provider or a network provider. In particular, the network interface unit can receive contents provided by the content provider or the network provider such as a movie, advertisement, game, VOD, a broadcasting signal, and the like and information related to the contents via a network. And, the network interface unit can receive update information and an update file of firmware provided by a network manager. And, the network interface unit can transmit data to internet or content provider or a network provider. And, the network interface unit 446 can select an application preferred by the network interface unit from among disclosed applications via a network and receive the application.

The storing unit 455 can store a program for processing and controlling a signal of the control unit 450 and a signal-processed video, audio, or a data signal. And, the storing unit 455 may perform a function of temporarily storing video, audio, or a data signal inputted from the external device interface unit 448 or the network interface unit 446. The storing unit can store information on a prescribed broadcasting channel through a channel remember function. The storing unit 455 can store an application or a list of applications inputted from the external device interface unit 448 or the network interface unit 446. And, the storing unit 455 can store various platforms described in the following. For example, the storing unit 455 can include at least one storing medium selected from the group consisting of a flash memory type memory, a hard disk type memory, a multimedia card micro type memory, a card type memory (e.g., SD or XD memory), RAM, and ROM (EEPROM, etc.). The digital TV 400 plays content files (a video file, a still image file, a music file, a document file, an application file, etc.) stored in the storing unit 455 and provides the files to a user. Although FIG. 4*b* shows an embodiment that the storing unit 455 and the control unit 450 are separately installed, by which the present invention may be non-limited. In particular, the storing unit 455 can be included in the control unit 450.

The user input interface unit 480 delivers a signal inputted by a user to the control unit 450 or delivers a signal of the control unit 450 to a user. For example, the user input interface unit 480 receives a control signal such as power on/off, channel selection, screen configuration, etc. from a remote control device 490 and processes the control signal according to various communication schemes including an RF communication scheme, an infrared communication scheme, and the like. Or, the user input interface unit 480 can transmit a control signal received from the control unit 450 to the remote control device 490. The user input interface unit 480 can deliver a control signal inputted by a local key (not depicted) such as a power key, a channel key, a volume key, a setting key, and the like to the control unit 450. The user input interface unit 480 can deliver a control signal inputted from a sensing unit (not depicted) configured to sense a gesture of a user to the control unit 450 or transmit a signal of the control unit 450 to the sensing unit (not depicted). In this case, the sensing unit (not depicted) can include a touch sensor, a voice sensor, a location sensor, an operation sensor, and the like.

The control unit 450 can generate and output a signal for outputting video or audio by de-multiplexing a stream inputted via the tuner 442, the demodulating unit 444, or the external device interface unit 448 or processing demultiplexed signals. A video signal processed by the control unit 450 is inputted into the display unit 460 and can be displayed as a video corresponding to the video signal. And, the video signal processed by the control unit 450 can be inputted into an external output device via the external device interface unit 448. An audio signal processed by the control unit 450 can be inputted into an external output device via the external device interface unit 448. Although it is not depicted in FIG. 4B, the control unit 450 can include a de-multiplexing unit, an image processing unit, and the like.

The control unit 450 can control overall operation of a digital TV. For example, the control unit 450 controls the tuner 442 to tune RF broadcasting corresponding to a channel selected by a user or a channel stored in advance. The control unit 450 can control the digital TV according to a user command inputted via the user input interface unit 480 or an internal program. In particular, the control unit accesses a network and may be able to enable a user to download an application or a list of application preferred by the user to the digital TV. For example, the control unit 450 controls the tuner 442 to input a signal of a channel which is selected according to a channel selection command received via the user input interface unit 480. The control unit processes video, audio, or a data signal of the selected channel. The control unit 450 controls the display unit 460 or the audio output unit 465 to output information on the channel selected by a user together with a processed video signal or an audio signal.

As a different example, the control unit 450 controls a video signal or an audio signal of an external device (e.g., a camera or a camcorder) inputted via the external device interface unit 448 to be outputted through the display unit 460 or the audio output unit 465 according to an external device image playback command received via the user input interface unit 480. Meanwhile, the control unit 450 can control the display unit 460 to display an image. For example, the control unit can control a broadcasting image inputted via the tuner 442, an external input image inputted via the external device interface unit 448, an image inputted via the network interface unit, or an image stored in the storing unit 455 to be displayed on the display unit 460. In this case, the image displayed on the display unit 460 may correspond to a still image or a video. The image may correspond to a 2D image or a 3D image. And, the control unit 450 can control content to be played. In this case, the content may correspond to content stored in a digital TV, received broadcasting content, or external input content inputted from the external. The content may correspond to a broadcasting image, an external input image, an audio file, a still image, an accessed web screen, or a document file. Meanwhile, in case of entering an application watch item, the control unit 450 can control an application or a list of applications capable of being downloaded from a digital TV or an external network to be displayed. The control unit 450 can control an application downloaded from an external network together with various user interfaces to be installed and executed. And, the control unit 450 can control an image related to an executed application to be displayed on the display unit 460 according to the selection of a user.

Meanwhile, although it is not depicted in the drawing, the digital TV can further include a channel browsing processing unit configured to generate a thumbnail image in response to a channel signal or an external input signal. The channel browsing processing unit receives an input of a stream signal (TS) outputted by the demodulating unit 444 or an input of a stream signal outputted by the external device interface unit 448, extracts an image from the inputted stream signal, and generates a thumbnail image. The generated thumbnail image can be inputted to the control unit 450 as it is or can be inputted to the control unit in a manner of being encoded. The control unit 450 can display a thumbnail list including a plurality of thumbnail images on the display unit 460 using the inputted thumbnail image. Meanwhile, the thumbnail images included in the thumbnail list can be sequentially or simultaneously updated. Hence, a user can conveniently identify contents of a plurality of broadcasting channels.

The display unit 460 converts an image signal, a data signal, and an OSD signal processed by the control unit 450, or an image signal, a data signal, and the like received from the external device interface unit 448 into R, G, and B signal to generate a driving signal. The display unit 460 may correspond to a PDP (Plasma Display Panel), an LCD (Liquid Crystal Display), an OLED (Organic Light Emitting Diode), a flexible display, a 3D display, or the like. Meanwhile, the display unit 460 can be used as an input device as well as an output device in a manner of being configured by a touch screen. The audio output unit 465 receives a signal (e.g., a stereo signal, 3.1 channel signal, or 5.1 channel signal) from the control unit 450 and outputs the signal as audio. The audio output unit 465 can be implemented by a speaker of various types.

Meanwhile, in order to sense a gesture of a user, as mentioned in the foregoing description, a sensing unit (not depicted) including at least one selected from the group consisting of a touch sensor, an audio sensor, a location sensor, and an operation sensor can be further installed in the digital TV. A signal sensed by the sensing unit (not depicted) can be delivered to the control unit 450 via the user input interface unit 480. Meanwhile, a capturing unit (not depicted) configured to capture a user can be further installed in the digital TV. Information on an image captured by the capturing unit (not depicted) can be inputted into the control unit 450. The control unit 450 can sense a gesture of a user by combining an image captured by the capturing unit (not depicted) and a signal sensed by the sensing unit (not depicted).

The power supply unit 470 supplies power to the digital TV. In particular, the power supply unit can supply power to the control unit 450 capable of being implemented in a form of SoC (System on Chip), the display unit 460 for displaying an image, and the audio output unit 465 for outputting audio. To this end, the power supply unit 490 can include a converter (not depicted) configured to convert AC power into DC power. Meanwhile, for example, if the display unit 460 is implemented by a liquid crystal panel including a plurality of backlight lamps, the display unit can further include an inverter (not depicted) capable of performing a PWM (Pulse Width Modulation) operation for brightness variableness or a dimming operation.

The remote control device 490 transmits a user input to the user input interface unit 480. To this end, the remote control device 490 may use Bluetooth, RF communication, Infrared (IR) communication, UWB, a Zigbee scheme, or the like. The remote control device 490 receives video, audio, or a data signal outputted by the user input interface unit 480 and displays the video, the audio, or the data signal on the remote control device 490. Or, the remote control device may output audio or vibration.

Besides, the digital TV according to the present invention may omit a partial component from among the displayed components or can further include a component not shown in the drawing if necessary. Meanwhile, unlike what is mentioned earlier, the digital TV may receive contents via the network interface unit or the external device interface unit and play the contents while not including the tuner and the demodulating unit.

Although it is not depicted, the aforementioned control unit can include a de-multiplexing unit, an image processing unit, an OSD generating unit, a mixer, a frame rate converter (FRC), and a formatter. And, the control unit can further include an audio processing unit and a data processing unit.

The de-multiplexing unit demultiplexes an inputted stream. For example, the de-multiplexing unit can de-multiplex an inputted MPEG-2 TS image, audio and a data signal. In this case, the stream signal inputted to the de-multiplexing unit may correspond to a stream signal outputted from the tuner, the demodulating unit, or the external device interface unit.

The image processing unit performs image processing on a demultiplexed image signal. To this end, the image processing unit can include an image decoder and a scaler. The image decoder decodes a demultiplexed image signal and the scaler scales resolution of the decoded image signal to display the image signal on the display unit. The image decoder can support various specifications. For example, if an image signal is encoded by MPEG-2 specification, the image decoder performs a function of an MPEG-2 decoder. If an image signal is encoded by a DMB (Digital Multimedia Broadcasting) scheme or H.264/H.265 specification, the image decoder can perform a function of H.264/H.265 decoder. Meanwhile, an image signal decoded by the image processing unit is inputted into the mixer.

The OSD generating unit generates OSD data according to a user input or autonomously. For example, the OSD generating unit generates data to display various data on a screen of the display unit in a graphic/text form/format based on a control signal of the user input interface unit. The generated OSD data includes various data including a user interface screen of the digital TV, various menu screens, a widget, an icon, viewing rate information, and the like. The OSD generating unit may generate data to display subtitles of a broadcasting image or broadcasting information based on an EPG (Electronic Program Guide).

The mixer mixes the OSD data generated by the OSD generating unit and the image signal processed by the image processing unit and provides it to the formatter. If the decoded image signal and the OSD data are mixed, OSD is displayed on a broadcasting image or an external input image in a manner of being overlaid.

The frame rate converter (FRC) converts a frame rate of an inputted image. For example, the frame rate converter can convert an inputted frame rate of 60 Hz into a frame rate of 120 Hz or 240 Hz according to an output frequency of the display unit. As mentioned in the foregoing description, a frame rate can be converted in various methods. For example, when the frame rate converter converts a frame rate of 60 Hz into a frame rate of 120 Hz, it may insert the same first frame between the first frame and a second frame or it may insert a third frame, which is anticipated from the first frame and the second frame, between the first frame and the second frame. As a different example, when the frame rate converter converts a frame rate of 60 Hz into a frame rate of 240 Hz, it may be able to insert the same frame or 3 anticipated frames between the legacy frames. Meanwhile, in case of not performing separate frame conversion, it may bypass the frame rate converter.

The formatter changes an output of the frame rate converter, which is inputted to the formatter, in accordance with an output format of the display unit. For example, the formatter can output R, G, and B data signal. The R, G, and B data signal can be outputted by a LVDS (Low Voltage Differential Signal) or mini-LVDS. If the output of the frame rate converter corresponds to a 3D image signal, the formatter outputs a 3D format output in accordance with the output format of the display unit. By doing so, it may be able to support a 3D service via the display unit.

Meanwhile, the audio processing unit included in the control unit can perform audio processing on a demultiplexed audio signal. The audio processing unit can be configured to process various audio formats. For example, if an audio signal is encoded by a format such as MPEG-2, MPEG-4, AAC, HE-AAC, AC-3, BSAC, or the like, the audio signal can be processed by including a decoder corresponding to the format. The audio processing unit included in the control unit can process base, treble, volume control, and the like. The data processing unit included in the control unit can perform data processing on a demultiplexed data signal. For example, although a demultiplexed data signal is encoded, the data processing unit can decode the signal. In this case, the encoded data signal may correspond to EPG information including start time of a broadcasting program broadcasted on each channel, end time, and the like.

Meanwhile, the aforementioned digital TV corresponds to an example according to the present invention. Each of the components can be integrated, added, or omitted according to the specification of the practically implemented digital TV. In particular, if necessary, two or more components can be integrated into one component or one component can be divided into two or more components. A function performed by each block explains an embodiment of the present invention. The scope of right of the present invention is not restricted by a specific operation or a device. Meanwhile, the digital device may correspond to an image signal processing device that performs signal processing on an image stored in the device or an inputted image. As a different example of the image signal processing device, a set-top box from which the display unit 460 and the audio output unit 465 shown in FIG. 4A are excluded, the aforementioned DVD player, a Blue-ray player, a gaming device, a computer, and the like may exist.

It will be apparent to those skilled in the art that the configuration discussed and shown in FIGS. 4A to 4B may be applicable to a mobile terminal as described in the following.

For example, a mobile terminal according to the present specification can include a voice recognition speaker, a mobile phone, a smartphone, a laptop computer, a digital broadcasting terminal, a PDA (Personal Digital Assistant), a PMP (Portable Multimedia Player), a navigation, a slate PC, a tablet PC, ultra book, a wearable device (e.g., a smart watch, a smart glass, a HMD (head mounted display)), and the like.

In the present specification, as an example of a terminal performing data communication with a smart controlling device 110 according to the present invention, a mobile terminal is explained in the following.

FIG. 5 is a block diagram to describe a mobile terminal as one example of a source device according to one embodiment of the present invention.

The mobile terminal 500 includes components such as a wireless communication unit 510, an input unit 520, a sensing unit 540, an output unit 550, an interface unit 560, a memory 570, a controller 580, and a power supply unit 590. It is understood that implementing all of the illustrated components shown in FIG. 5 is not a requirement, and that greater or fewer components may alternatively be implemented.

In particular, the wireless communication unit 510 among the components may typically include at least one or more modules which permit communications such as wireless communications between the mobile terminal 500 and a wireless communication system, communications between the mobile terminal 500 and another mobile terminal, communications between the mobile terminal 500 and an external server. Further, the wireless communication unit 510 typically includes at least one or more modules which connect the mobile terminal 500 to at least one or more networks.

The wireless communication unit 510 may include at least one of a broadcast receiving module 511, a mobile communication module 512, a wireless Internet module 513, a short-range communication module 514, and a location information module 515.

The input unit 520 may include a camera (or a video or image input unit) 521 for a video or image signal input, a microphone 522, which is one type of audio input device for inputting an audio signal, and a user input unit 523 (for example, a touch key, a push key (or, a mechanical key), etc.) for allowing a user to input information. Data (for example, audio, video, image, and the like) is obtained by the input unit 520 and may be analyzed and processed into a user's control command by controller 580.

The sensing unit 540 may be typically implemented using at least one or more sensors configured to sense internal information of the mobile terminal, the surrounding environment of the mobile terminal, user information, and the like. For example, the sensing unit 540 includes a proximity sensor 541 and an illumination sensor 542. If desired, the sensing unit 540 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, camera 521), a microphone 522, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 500 may be configured to utilize information obtained from the sensing unit 540, and in particular, information obtained from at least one or more sensors of the sensing unit 540, and combinations thereof.

The output unit 550 may be typically configured to output various types of information, such as audio, video, tactile output, and the like. The output unit 550 includes a display unit 551, an audio output unit (or module) 552, a haptic module 553, and an optical output unit (or module) 554. The display unit 551 may have an inter-layered structure or an integrated structure with a touch sensor in order to embody a touchscreen. The touchscreen may provide an output interface between the mobile terminal 500 and a user, as well as function as the user input unit 523 which provides an input interface between the mobile terminal 500 and the user.

The interface unit 560 serves as an interface with various types of external devices that can be coupled to the mobile terminal 500. The interface unit 560, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 500 may perform assorted control functions associated with a connected external device, in response to the external device being connected to the interface unit 560.

The memory 570 is typically implemented to store data to support various functions or features of the mobile terminal 500. For instance, the memory 570 may be configured to store application programs (or programs) executed or run in the mobile terminal 500, data or instructions (or commands) for operations of the mobile terminal 500, and the like. Some of these application programs may be downloaded from an external server via wireless communication. Other application programs may be installed within the mobile terminal 500 at the time of manufacturing or shipping, which is typically the case for basic functions of the mobile terminal 500 (for example, receiving a call, placing a call, receiving a message, sending a message, and the like). It is common for application programs to be stored or saved in the memory 570, installed on the mobile terminal 500, and executed by the controller 580 to perform an operation (or function) of the mobile terminal 500.

The controller 580 may typically functions to control overall operations of the mobile terminal 500, in addition to the operations associated with the application programs. The controller 580 may provide or process information or functions appropriate for a user by processing signals, data, information and the like, which are input or output by the various components mentioned in the foregoing description, or activating application programs stored in the memory 570.

Moreover, in order to execute or run the application program saved in the memory 570, the controller 580 can control some or all of the components illustrated in FIG. 5. Furthermore, in order to execute or run the application program, the controller 580 may activate at least two of the components included in the mobile terminal 500 in a manner that the at least two components are combined together.

The power supply unit 590 can be configured to receive external power or provide internal power in order to supply appropriate power required for operating elements and components included in the mobile terminal 500. The power supply unit 590 may include a battery, and the battery may be configured to be embedded in the terminal body, or configured to be detachable from the terminal body.

At least some of the components mentioned in the foregoing description can operate cooperatively to implement operations, controls or controlling methods of the mobile terminal according to various embodiments mentioned in the following description. Moreover, the operations, controls and controlling methods of the mobile terminal may be implemented on the mobile terminal by running or executing at least one application program saved in the memory 560.

The broadcast reception module 511 of the radio communication unit 510 is typically configured to receive a broadcast signal and/or broadcast associated information from an external broadcast managing server via a broadcast channel. The broadcast channel may include a satellite channel, a terrestrial channel, or both. In some embodiments, two or more broadcast reception modules 511 may be utilized to facilitate simultaneously receiving of two or more broadcast channels, or to support switching among broadcast channels.

The broadcast managing server may mean a server which generates and transmits a broadcast signal and/or broadcast associated information, or a server which receives a pre-generated broadcast signal and/or broadcast associated information, and sends such items to the terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of the broadcast associated information may include information associated with a broadcast channel, a broadcast program, a broadcast event, a broadcast service provider, or the like. The broadcast associated information may also be provided via a mobile communication network, and in this case, received by the mobile communication module 512.

The broadcast associated information may be implemented in various formats. For instance, the broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 570.

The mobile communication module 512 can transmit and/or receive wireless signals to and from at least one or more network entities. Typical examples of a network entity include a base station, an external terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signals transmitted and/or received via the mobile communication module 512 may include audio call signals, video (telephony) call signals, or various formats of data to support communication of text and multimedia messages.

The wireless Internet module 513 is configured to facilitate wireless Internet access. This module may be internally or externally coupled to the mobile terminal 500. The wireless Internet module 513 may be configured to transmit and/or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 513 may transmit/receive data according to at least one of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 513 performs such wireless Internet access. As such, the Internet module 513 may cooperate with, or function as, the mobile communication module 512.

The short-range communication module 514 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 514 in general supports wireless communications between the mobile terminal 500 and a wireless communication system, communications between the mobile terminal 500 and another mobile terminal 500, or communications between the mobile terminal 500 and a network where another mobile terminal 500 (or an external server) is located, via wireless area networks. One example of the wireless area networks is a wireless personal area networks.

In some embodiments, another mobile terminal (which may be configured similarly to mobile terminal 500) may be a wearable device, for example, a smart watch, a smart glass or a head mounted display (HMD), which is able to exchange data with the mobile terminal 500 (or otherwise interwork with the mobile terminal 500). The short-range communication module 514 may sense or recognize the wearable device, and permit communication between the wearable device and the mobile terminal 500. In addition, when the sensed wearable device is a device which is authenticated to communicate with the mobile terminal 500, the controller 580, for example, may cause transmission of data processed in the mobile terminal 500 to the wearable device via the short-range communication module 514. Hence, a user of the wearable device may use the data processed in the mobile terminal 500 on the wearable device. For example, when a call is received in the mobile terminal 500, the user may answer the call using the wearable device. Also, when a message is received in the mobile terminal 500, the user can check the received message using the wearable device.

The position information module 515 is generally configured to detect, calculate, derive or otherwise identify a location of the mobile terminal. As a representative example, the position information module 515 includes a Global Position System (GPS) module, a Wi-Fi module, or both. For instance, if utilizing a GPS (global positioning system) module, the mobile terminal can obtain a location of the mobile terminal using a signal sent by a GPS satellite. For another instance, if utilizing the Wi-Fi module, the mobile terminal can obtain its location based on information of a wireless AP (access point) configured to transmit or receive wireless signals to or from the Wi-Fi module. If desired, the position information module 515 may alternatively or additionally function with any of the other modules of the radio communication unit 510 to obtain data related to the position of the mobile terminal. The position information module 515 may include a module to obtain a location (or a current location) of the mobile terminal and is non-limited to a module for directly calculating or obtaining a location of the mobile terminal.

The input unit 520 may be configured to permit various types of inputs to the mobile terminal 500. Examples of such inputs include image (or video) information (or signal), audio information (or signal), data, and user input. For the input of the image or video information, the mobile terminal 500 may include one or a plurality of cameras 521. Such cameras 521 may process image frames of still pictures or video obtained by image sensors in a video call mode or an image capture mode. The processed image frames can be displayed on the display unit 551 or stored in memory 560. In some cases, the cameras 521 provided to the mobile terminal 500 may be arranged in a matrix configuration to permit a plurality of images having various angles or focal points to be input to the mobile terminal 100. As another example, the cameras 521 may be disposed in a stereoscopic arrangement to acquire left and right images for implementing a stereoscopic image.

The microphone 522 processes an external sound signal into audio data. Such audio data can be variously utilized in accordance with a function (or application program) currently run in the mobile terminal 500. If desired, the microphone 522 may include assorted noise removing algorithms to remove unwanted noise generated in the course of receiving the external sound data.

The input unit 520is a component that permits input by a user. If information is inputted through the input unit 520, the controller 580 can control an operation of the mobile terminal 500 to correspond to the inputted information. The input unit 520 may include mechanical input means (for example, a mechanical key, a button disposed on a front and/or rear surface or a side surface of the mobile terminal 500, a dome switch, a jog wheel, a jog switch, and the like), or a touch-sensitive input means, among others. As one example, touch-sensitive input means may be a virtual key, a soft key, or a visual key, which is displayed on a touchscreen through software processing, or a touch key which is disposed on the mobile terminal 500 at a location that is other than the touchscreen. On the other hand, the virtual key or the visual key may be displayed on the touchscreen in various shapes, for example, graphic, text, icon, video, or a combination thereof.

Meanwhile, the sensing unit 540 is generally configured to sense at least one of internal information of the mobile terminal, surrounding environment information of the mobile terminal, user information, and the like and then generates a sensing corresponding to the sensed information. Based on the sensing signal, the controller 580 generally cooperates with the sensing unit 540 to control operation of the mobile terminal 500 or execute data processing, a function or an operation associated with an application program installed on the mobile terminal. The sensing unit 540 may be implemented using any of a variety of representative sensors, some of which will now be described in more detail as follows.

First of all, the proximity sensor 541 may include a sensor to sense a presence or absence of an object approaching a surface, or an object disposed near a surface, by using an electromagnetic field, infrared rays, or the like without a mechanical contact. The proximity sensor 541 may be arranged at an inner region of the mobile terminal covered by the touchscreen, or near the touchscreen.

The proximity sensor 541, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor 541 can sense proximity of a pointer relative to the touchscreen by changes of an electromagnetic field, which is responsive to an approach of an object with conductivity. In this case, the touchscreen (touch sensor) may also be categorized as a proximity sensor.

For clarity of the following description, the term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 541 may sense a proximity touch, and proximity touch patterns (for example, distance, direction, speed, time, position, moving status, and the like). In general, controller 580 processes data corresponding to proximity touches and proximity touch patterns sensed by the proximity sensor 541, and causes output of visual information through the touchscreen. In addition, the controller 580 can control the mobile terminal 500 to execute different operations or process different data according to whether a touch with respect to a point on the touchscreen is either a proximity touch or a contact touch.

A touch sensor can sense a touch applied to the touchscreen, such as display unit 551, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 551, or convert capacitance occurring at a specific part of the display unit 551, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, and the like.

When a touch input is sensed by a touch sensor, corresponding signal(s) may be transmitted to a touch controller. The touch controller may process the received signal(s), and then transmit corresponding data to the controller 580. Accordingly, the controller 580 may sense which region of the display unit 551 has been touched. Here, the touch controller may be one of a component separate from the controller 580, the controller 580 itself, and combinations thereof.

In some embodiments, the controller 580 may execute the same or different controls according to a type of a touch object that touches the touchscreen or a touch key provided in addition to the touchscreen. Whether to execute the same or different control according to the object which provides a touch input may be decided based on a current operating state of the mobile terminal 500 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a sensing target using ultrasonic waves. The controller 580, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 521 is described as one component of the input unit 520 and typically includes at least one of a camera sensor (CCD, CMOS etc.), a photo sensor (or image sensors), and a laser sensor.

Implementing the camera 521 with a laser sensor may allow detection of a touch to a sensing target with respect to a 3D stereoscopic image. The photo sensor may be laminated on, or overlapped with, the display device. The photo sensor may be configured to scan movement of the sensing target in proximity to the touchscreen. In more detail, the photo sensor may include photo diodes and transistors at rows and columns to scan content received at the photo sensor using an electrical signal which changes according to the quantity of applied light. Namely, the photo sensor may calculate the coordinates of the sensing target according to variation of light to thus obtain position information of the sensing target.

The display unit 551 is generally configured to display (or output) information processed in the mobile terminal 500. For example, the display unit 551 may display running screen information of an application program run on the mobile terminal 500, a user interface (UI) information in response to the running screen information, and/or a graphic user interface (GUI) information in response to the running screen information.

In some embodiments, the display unit 551 may be implemented as a stereoscopic display unit for displaying stereoscopic images.

A typical stereoscopic display unit may employ a stereoscopic display scheme such as a stereoscopic scheme (glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The sound output module 552 is generally configured to output audio data. Such audio data may be obtained from any of a number of different sources, such that the audio data may be received from the radio communication unit 510 or may have been stored in the memory 560. The audio data may be output during modes such as a call signal reception mode, a call mode, a record mode, a voice recognition mode, a broadcast reception mode, and the like. The sound output module 552 can provide audible output related to a particular function (e.g., a call signal reception sound, a message reception sound, etc.) performed by the mobile terminal 500. The sound output module 552 may also include a receiver, a speaker, a buzzer, and/or the like.

A haptic module 554 can be configured to generate various tactile effects that can be sensed by a user. A typical example of a tactile effect generated by the haptic module 554 is vibration. The strength, pattern and the like of the vibration generated by the haptic module 554 can be controlled by a user's selection or a setting of the controller. For example, the haptic module 554 may combine and output different vibrations together or may output different vibrations in a sequential manner.

As well as the vibration, the haptic module 554 can generate various other tactile effects, including an effect by stimulation such as a pin arrangement moving vertically to a contacted skin surface, a spray or suction force of air through a jet orifice or a suction opening, a touch to a skin surface, a contact of an electrode, an electrostatic force, an effect by reproducing the cold/warm sense using an endothermic or exothermic element, and the like.

The haptic module 554 can also be implemented to allow the user to feel a tactile effect through a muscle sensation such as the user's fingers or arm, as well as to transfer the tactile effect through direct contact. Two or more haptic modules 554 may be provided according to a configuration type of the mobile terminal 500.

An optical output unit 553 can output a signal for indicating an event occurrence using light of a light source. Examples of events occurring in the mobile terminal 500 may include a message reception, a call signal reception, a missed call, an alarm, a schedule notification, an email reception, an information reception through an application, and the like.

A signal output by the optical output unit 553 may be implemented in such a manner that the mobile terminal emits monochromatic light or light with a plurality of colors. The signal output may be terminated as the mobile terminal senses that a user has checked the event for example.

The interface unit 570 serves as an interface for all external devices connected to the mobile terminal 500. For example, the interface unit 570 can receive data transmitted from an external device, receive power to transfer to elements and components within the mobile terminal 500, or transmit internal data of the mobile terminal 500 to such external device. The interface unit 570 may include wired/wireless headset ports, external power supply ports, wired/wireless data ports, memory card ports, ports for connecting a device having an identification module, audio input/output (I/O) ports, video I/O ports, earphone ports, and/or the like.

The identification module may include a chip configured to store various information for authenticating authority in using the mobile terminal 500 and may include a user identity module (UIM), a subscriber identity module (SIM), a universal subscriber identity module (USIM), and the like. In addition, the device having the identification module (also referred to herein as an "identifying device") may be manufactured in the form of a smart card. Hence, the identifying device can be connected with the terminal 500 via the interface unit 570.

When the mobile terminal 500 is connected with an external cradle, the interface unit 570 can serve as a passage to allow power from the cradle to be supplied to the mobile terminal 500 or may serve as a passage to allow various command signals inputted by the user from the cradle to be transferred to the mobile terminal there through. Various command signals or the power inputted from the cradle may operate as signals for recognizing that the mobile terminal is properly mounted on the cradle.

The memory 560 can store programs to support operations of the controller 580 and may temporarily store input/output data (for example, phonebook, messages, still images, videos, etc.). The memory 560 may store data related to various patterns of vibrations and audio that are outputted in response to touch inputs to the touchscreen.

The memory 560 may include at least one of types of storage mediums including a flash memory, a hard disk, a solid state disk, a silicon disk, a multimedia card micro type, a card-type memory (e.g., SD memory, XD memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 500 may also operate in relation to a web storage device that performs the storage function of the memory 560 on Internet.

As mentioned in the foregoing description, the controller 580 controls operations related to the application programs and may typically controls overall operations of the mobile terminal 500. For example, the controller 580 may set or release a lock state for restricting a user from inputting a control command with respect to applications if a status of the mobile terminal meets a preset condition.

The controller 580 may perform the controlling and processing associated with voice calls, data communications, video calls, and the like, or may perform pattern recognition processing to recognize a handwriting input or a picture drawing input performed on the touchscreen as characters or images, respectively. In addition, the controller 580 can control one or a combination of those components mentioned in the foregoing description in order to implement various embodiments mentioned in the following description.

The power supply unit 590 receives an external or internal power under the control of the controller 580 and then supplies the power required for operating the respective elements and components. The power supply unit 590 may include a battery, which is typically rechargeable or be detachably coupled to the terminal body for charging.

The power supply unit 590 may include a connection port. The connection port may be configured as one example of the interface unit 570 to which an external charger for supplying power to recharge the battery is electrically connected.

As another example, the power supply unit 590 may be configured to recharge the battery in a wireless manner without use of the connection port. In doing so, the power supply unit 590 can receive power, transferred from an external wireless power transmitter, using at least one of an inductive coupling method which is based on magnetic induction or a magnetic resonance coupling method which is based on electromagnetic resonance.

Meanwhile, various embodiments described herein may be implemented in a computer-readable medium, a machine-readable medium, or similar medium using, for example, software, hardware, or any combination thereof In the foregoing description, the smart controlling device 110 is explained as a separate configuration in the digital system and a digital TV and a mobile terminal are respectively illustrated in FIG. 4A, FIG. 4B and FIG. 5 as an example of a terminal performing data communication with the smart controlling device. However, the smart controlling device 110 according to the present invention can also be implemented by a single configuration such as a type capable of being embedded or combined with the digital TV or the mobile terminal shown in FIG. 4A, 4B or FIG. 5. Meanwhile, the smart controlling device 110 can be referred to by various terms such as an audio device, a video device, and the like depending on an implementation type of the smart controlling device.

Figure 6A:
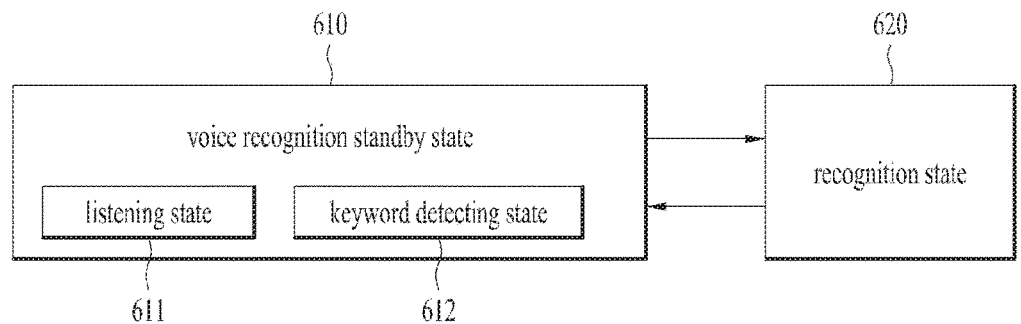
FIG. 6A is a conceptual diagram for an execution state of a voice recognition function.
Figure 6B:
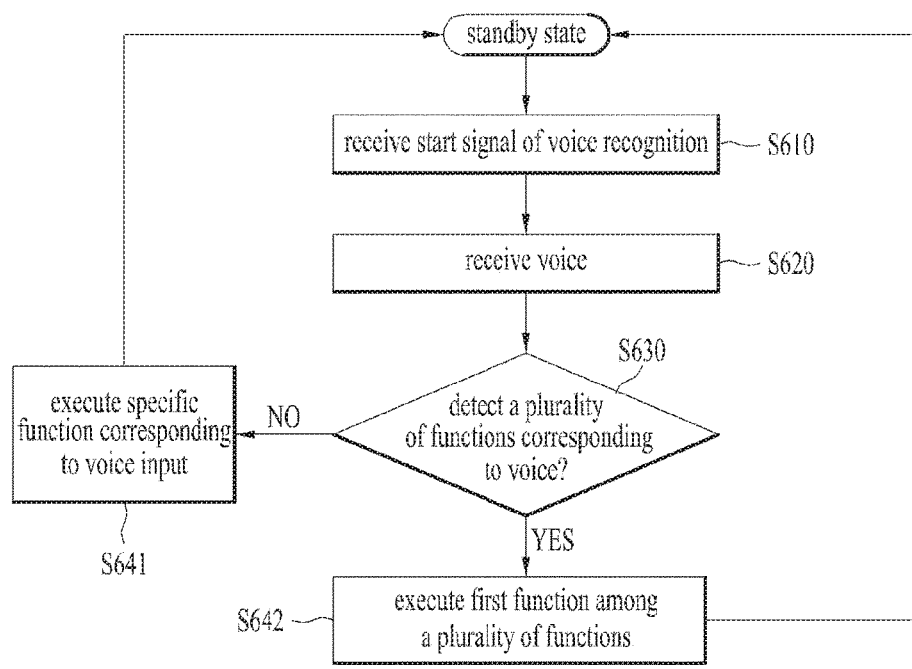
FIG. 6B is a flowchart for a method of executing a voice recognition function.

FIG. 6A is a conceptual diagram for an execution state of a voice recognition function and FIG. 6B is a flowchart for a method of executing a voice recognition function according to embodiments of the present disclosure.

A voice recognition function corresponds to converting an audio signal received through an audio sensor such as a microphone to text. The voice recognition function may further include performing a specific operation based on the information converted into text. In particular, the voice recognition function corresponds to a function for determining whether or not a received voice corresponds to a specific word or a function for detecting a voice command.

The smart controlling device 110 according to the present invention can store voice recognition application and information related to the voice recognition function in the memory 240. The voice recognition application can perform voice recognition via a database installed in the smart controlling device or a database installed in a communication-connected server.

A voice recognition function may have a plurality of execution states. Specifically, the controller 220 can set an execution state of the voice recognition function to either a voice recognition standby state 610 waiting for an input of a command trigger or a recognition state 620 performing voice recognition by analyzing voice to start the voice recognition function.

The voice recognition standby state 610 can include a listening state 611 for sensing a voice of a volume equal to or greater than a prescribed volume and a keyword detecting state 612 for detecting a specific word.

The controller 220 can sense reception of a voice of a volume equal to or greater than a prescribed volume in the listening state 611. The controller may 220 only detect the voice of the volume equal to or greater than the prescribed volume in the listening state 611 and may not perform voice recognition functions.

If a voice input equal to or greater than the prescribed volume is received, the controller 220 can switch the execution state of the voice recognition function to the keyword detecting state 612 from the listening state 611.

The controller 220 can detect whether or not a specific word was received in the keyword detecting state 612. The specific word corresponds to a command trigger for starting the voice recognition function. It may possible to configure a different signal for the command trigger depending on a smart controlling device 110 or an application providing the voice recognition function.

If a voice input corresponding to a specific word is received in the keyword detecting state 612, the controller 220 can switch to the recognition state 620. For example, if a predetermined specific word such as "Alice" is received as a voice input in the keyword detecting state 612, the controller 220 may detect the specific word and switch the execution state of the voice recognition function to the recognition state 620.

On the contrary, if a voice corresponding to a specific word is not received in the keyword detecting state 612, the controller 220 can switch the execution state of the voice recognition function back to the listening state 611. For example, if a voice is not received for more than a prescribed time in the keyword detecting state 612, the controller 220 can switch the execution state of the voice recognition function to the listening state 611. Or, if a voice received in the keyword detecting state 612 does not correspond to a specific word, the controller 220 can switch the execution state of the voice recognition function back to the listening state 611.

In the following, a method of executing a voice recognition function in the recognition state is explained in more detail with reference to FIG. 6B.

Referring to FIG. 6B, if the controller 220 receives a command trigger in the keyword detecting state 612 [S610], the controller 220 can start the voice recognition function. Subsequently, the controller 220 can receive a voice input in the recognition state 620 [S620].

If a voice input is received in the recognition state 620, the controller 220 can analyze the voice based on various predetermined algorithms for voice and speech analysis which is well known in the art. Since the contents of the algorithm are well known to those skilled in the art, explanation on the contents is omitted in the present specification.

The controller 220 can detect at least one function corresponding to the voice input based on a result of the analysis. In particular, the controller 220 may detect one or a plurality of functions corresponding to the voice input.

The controller 220 can determine whether or not one or more functions corresponding to the voice input is detected [S630]. If a function corresponding to the voice input is detected, the controller 220 can execute a first function corresponding to the voice input [S642].

The first function may correspond to either a function configured as a basic function or a function of high priority. When a plurality of functions corresponds to a single voice input, the basic function may be the first to be executed among the plurality of the functions. The priority can be determined according to various factors such as alphabetical order, an execution frequency, a use pattern, or a music source chart ranking. For example, if a function for playing songs is detected, priority can be determined by a descending order of a playback frequency of each song.

For example, the voice input may include the term "Girl's generation" and the controller may determine that the user is commanding playback of a song corresponding to the musical group Girls Generation. The voice input may also include the name of a particular song by the musical group. In this case, the controller 220 can execute the 'Girls generation music playing function' as a first function.

In the foregoing description, when a plurality of functions corresponding to a voice input is detected, a first function is executed. However, it may be able to output notification information to make a user input a voice input again without executing the first function. For example, the controller 220 may output a query to request a more specific voice input, such as "A plurality of music sources is detected. Which would you like to play?".

Meanwhile, if a single function is detected corresponding to a voice input, the controller 220 can immediately execute the single function corresponding to the voice input [S641]. For example, if the controller 220 receives a voice input such as 'play track 1', the controller can determine and play a music source stored in the first track. If a specific operation is performed in the recognition state 620 based on a voice input, the controller 220 can switch the execution state of the voice recognition function back to the standby state 610. By doing so, the controller 220 can selectively analyze voice recognition-required voices only without analyzing all voices received via a microphone, thereby preventing unnecessary power consumption.

In order to input a voice input, a user may speak a a specific command trigger followed by a voice command. However, when the user wishes to input multiple voice commands, the user may be required to speak the command trigger for each command multiple times, which may be inconvenient and lead to inaccurate voice input recognition.

Figure 7:
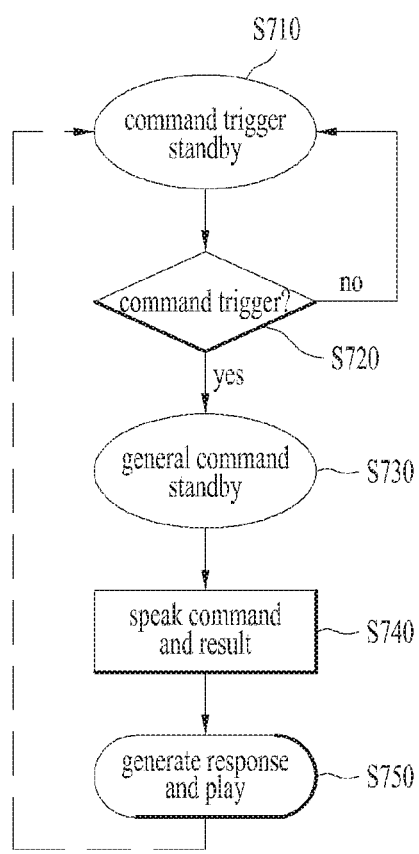
FIG. 7 is a flowchart for explaining a method of processing data of a smart controlling device according to an embodiment of the present disclosure.

FIG. 7 is a flowchart depicting a method of processing data of a smart controlling device according to an embodiment of the present invention.

In the following description, we assume that the smart controlling device 110 is in an execution or an executable state.

First of all, the smart controlling device 110 may wait for a command trigger [S710] and determines whether or not the command trigger is received [S720].

If the command trigger is received, the smart controlling device switches to a general command standby state for receiving command data [S730].

As mentioned earlier in the step S730, if the command data is received after the smart controlling device is switched to the general command standby state, the smart controlling device processes the command data to generate a result data [S740].

And, the smart controlling device generates a response from the result data and plays the response [S750].

Figure 8:
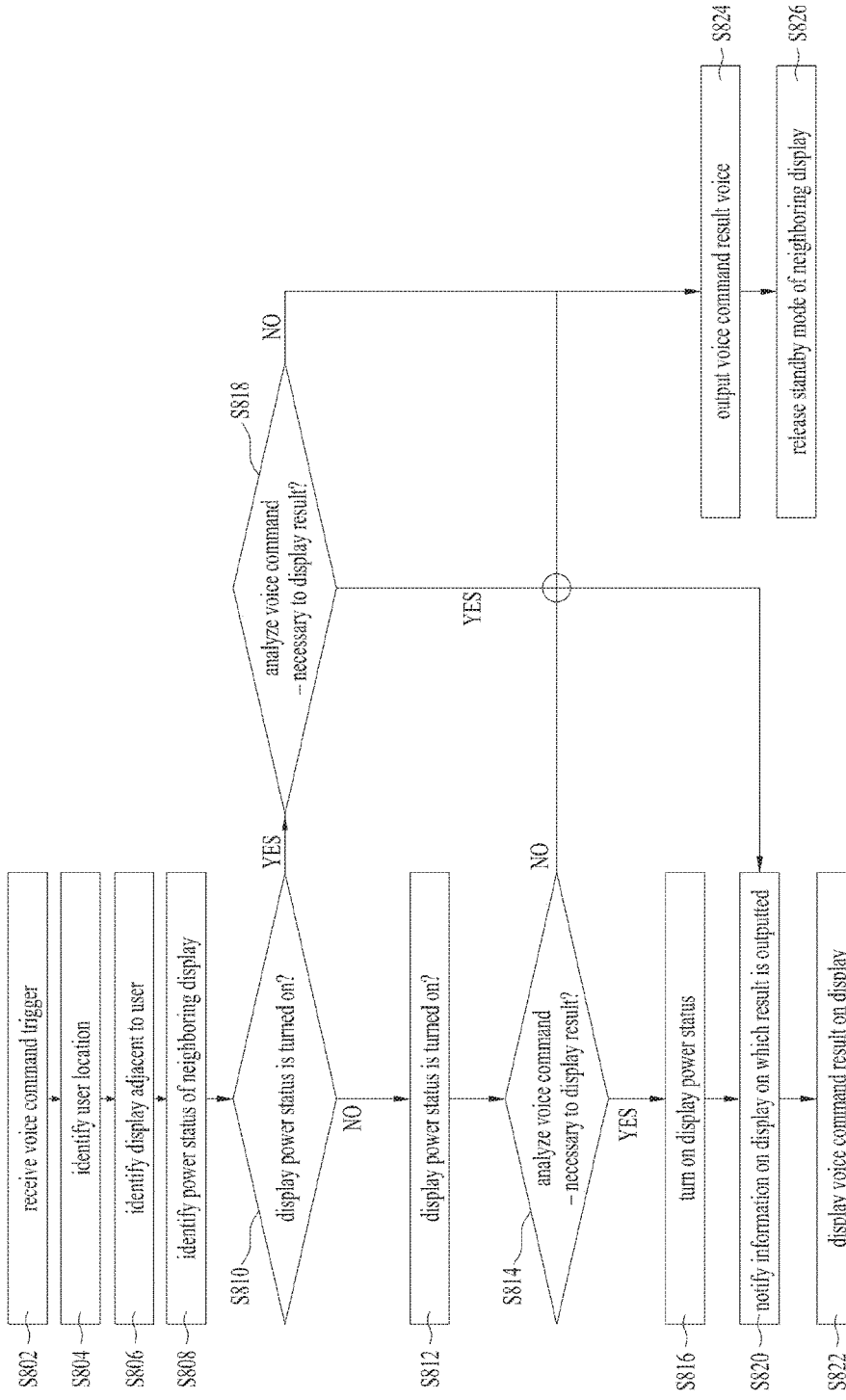
FIG. 8 is a flowchart for explaining a method of processing data of a smart controlling device according to one embodiment of the present disclosure.

FIG. 8 is a flowchart depicting a method of processing data of a smart controlling device according to one embodiment of the present invention.

If the command trigger is received in the standby state [S802] as discussed, the smart controlling device 110 is switched to a command data received state and detects a location of a speaker (i.e., user) who has spoken the trigger data [S804].

If the location of the user is detected, the smart controlling device 110 detects whether or not a display device exists within a predetermined range on the basis of the detected user location [S806]. In some cases, the user location, which becomes a criterion for detecting whether or not the display device exists, can be based on the smart controlling device 110. In other words, detecting whether or not the display device exists may correspond to a location of the smart controlling device 110 rather than the user.

Meanwhile, the display device may correspond to any electronic devices equipped with a display including the digital TV shown in FIG. 4A, 4B and the mobile terminal shown in FIG. 5. As a result of detecting the display device in the step S806, if a plurality of display devices is detected, the smart controlling device 110 can select one from among a plurality of the display devices. In this case, the smart controlling device can select a display device on the basis of a current position of a user (or the smart controlling device 110). In particular, the smart controlling device can select a display device closest from the user (or the smart controlling device 110). Or, a display device including a display of which a current display state corresponds to a standby state or power is turned on can be selected from among a plurality of the display devices.

If there are a plurality of display devices including a display that the current display state correspond to the standby state or the power is turned on, the smart controlling device can select a display device closest from the smart controlling device from among a plurality of the display devices on the basis of the current position of the user (or the smart controlling device 110). Or, it may consider not only the current position of the user (or the smart controlling device 110) but also a direction that the user is facing. For example, when a user is looking at a direction corresponding to 12 o'clock, or is moving toward that direction, if a display device positioned at a direction corresponding to 6 o'clock is selected, it would be necessary for the user to turn around or move in the opposite direction to watch the display of the selected display device, which is undesired. The direction of the user may become another factor for selecting a display.

In the foregoing description, for clarity, although it is explained as a single display is selected from among a plurality of the detected display devices, the present invention may not be limited to this. In some embodiments, the smart controlling device 110 can select a plurality of display devices from among a plurality of the display devices detected in S806. In this case, although a plurality of the display devices may be selected, it may be able to put priority on one or more of the selected display devices with reference to the aforementioned criteria and control each of the plurality of the selected display devices accordingly based on priority. By doing so, it may be able to flexibly cope with various situations such as an error, a network problem, and the like in a relation with a specific display device.

In the step S806, if a display device adjacent to the user (or smart controlling device 110) is detected and selected on the basis of a current position, the smart controlling device 110 may determine a power status of the selected display device [S808]. In this case, the power status of the display device may correspond to a power-off status, a stand-by status, or a power-on status.

The smart controlling device 110 determines whether or not a display power status of the display device corresponds to the power-on status [S801]. If the display power status is not the power-on status, the smart controlling device 110 transmits a control command to change the display power status to a stand-by mode or the stand-by status [S812]. In this case, as a result of the step S810, if the display power status is not the power-on status but already in the stand-by status, the step S812 can be omitted.

If necessary, an operation by the display device for performing mutual data communication with the smart controlling device 110 can be included as well. For example, the operation can include an operation of establishing a Bluetooth interface, WiFi interface, and the like, an operation of turning on power, authentication, registration, and the like.

Subsequently, if the display power status of the display device is switched to the stand-by status, the smart controlling device 110 analyzes a voice input, i.e., command data, which is received after the step S802. After the command data is analyzed, the smart controlling device determines whether or not a response data corresponds to a signal required to be outputted via the display of the selected display device [S814]. In other words, the smart controlling device 110 determines whether or not the command data requires an audio response to be output by the smart controlling device, or whether a non-audio response is required to be output by a different device, such as output of an image format, a text format, or the like.

As a result of the step S814, if the response data is determined to require output via the display, the smart controlling device 110 transmits a control command for turning on power of the display to the selected display device to switch the display power to the power-on status from the stand-by status [S816].

The smart controlling device 110 transmits response data to be outputted via the turned-on selected display device and a signal for controlling the response data to be outputted to the display device [S818]. The display device outputs the response data via the display according to the control of the smart controlling device 110 [S822]. Meanwhile, in relation to the output of the response data, if other data was being outputted via the display or an application was being executed at the display device, the smart controlling device 110 or the display device stops (or switches to the background) the previously displayed or executed data or application and causes output of the response data. The response data may also be output in various forms, such as a full screen, a pop-up window, split screen, overlay on a prescribed area of a screen, and the like.

When the display device can output audio data of the responses data in addition to displaying the response data. Additionally, guide data (indicating start of display, a type of display, identification of a display device, or the like), which is related to the output of the response data, can be outputted via an audio output device such as a speaker of the smart controlling device 110 or the display device using an output format (e.g., audio output format) different from the displayed response data.

Referring back to S810, if power of the selected display device is already in the turned-on status, as mentioned earlier in the step S814, the smart controlling device analyzes a command data, which is received after the command trigger is received, and determines whether or not it is necessary to output a response data via the display of the display device [S818]. In this case, as shown in S820, the response data is outputted on the display. Yet, as a result of the step S814 or S818, if it is not necessary to output the response data via the display of the display device, in other words, if it is sufficient to output the response data using an audio format only, the response data is outputted in an audio format via an audio output device (signal outputting unit) of the smart controlling device 110 [S824] and the switching of the display stand-by mode of the selected display device is cancelled [S826]. In another embodiment, if an audio output device of a previously selected display device is being used rather than the audio output device of the smart controlling device 110, the switching of the stand-by mode may not be cancelled. As mentioned in the foregoing description, it may be able to control the turn-on status or the current stand-by status to be maintained and use the audio output device for outputting audio of the response data.

Figure 9:
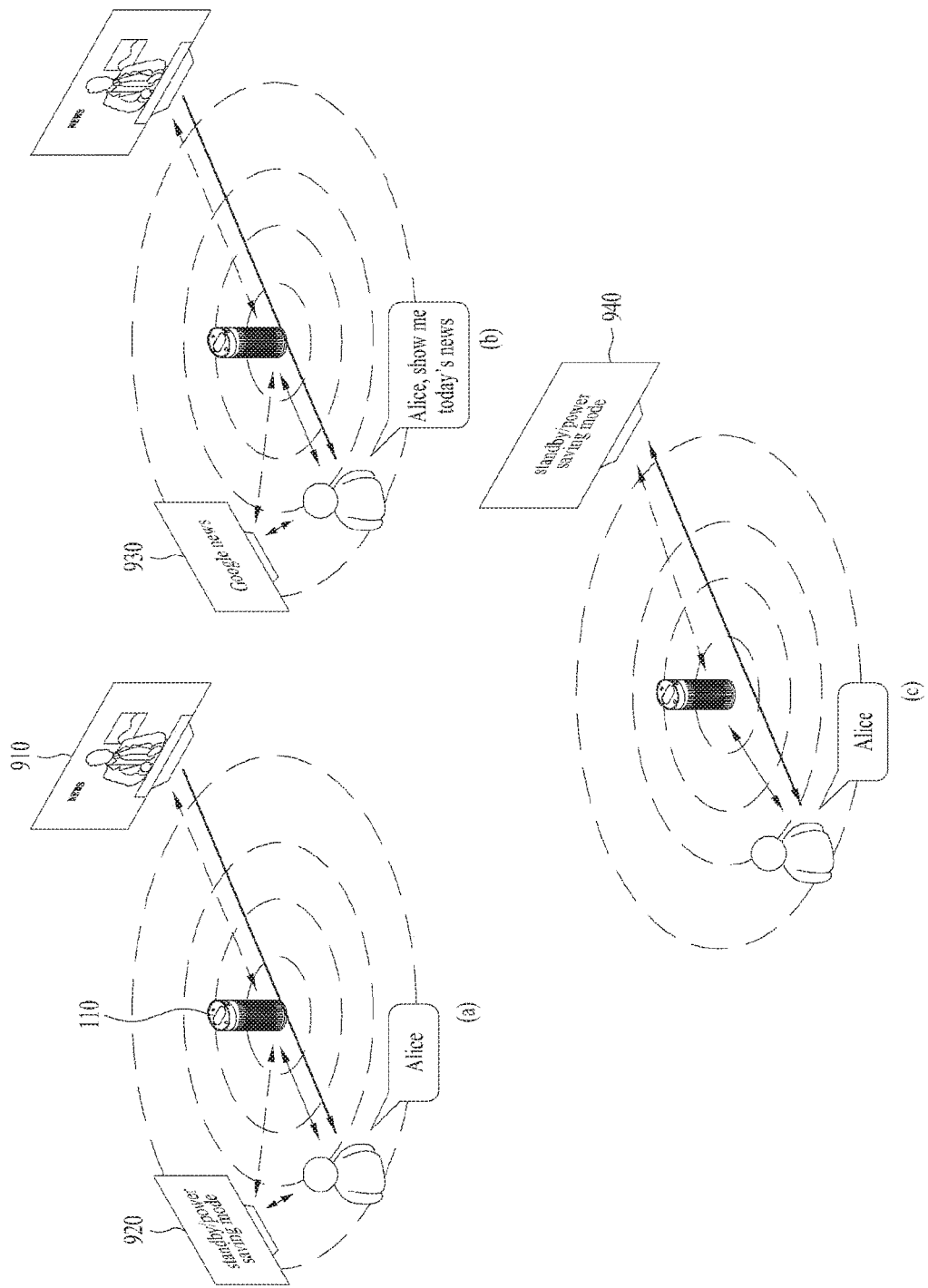
FIG. 9 is a diagram for explaining a method of controlling a display device of a smart controlling device according to one embodiment of the present disclosure.

FIG. 9 is a diagram depicting a method of controlling a display device of a smart controlling device according to one embodiment of the present invention.

For example, FIGS. 9*a* and 9*b* show a situation where a plurality of display devices is near the smart controlling device and FIG. 9*c* shows a situation where only a single display device is near the smart controlling device.

First of all, referring to FIG. 9*a*, while a user is watching a first display device 910, the user may input a command trigger to the smart controlling device 110. In this case, the first display device 910 may be located outside of a predetermined distance range from the smart controlling device 110 or the user.

If the command trigger is received at the smart controlling device and it is determined that the first display device 910 is located outside of the predetermined or threshold distance range, the smart controlling device 110 may instead detect a second display device 920 located within the predetermined distance range. In some cases, the first display device may not be detectable by the smart controlling device due to the distance, or the smart controlling device may detect the first display device and its relative distance, and determine that it is outside of the predetermined distance range. The smart controlling device 110 may determine a display power status of the detected second display device 920. If the display power status is off, the smart controlling device transmits a first control command to the second display device to switch the display power status of the second display device to a stand-by mode.

The second display device switches the display power status to the stand-by mode from the off status according to the first control command and maintains the stand-by mode.

As shown in FIG. 9*b*, the smart controlling device 110 analyzes command data which is received after the command trigger. The smart controlling device 110 determines a format of a response output based on a result of analysis to determine a format of a response to be transmitted in response to the command data. The response data may be and output of an audio format, a text format, an image format, a video format, and the like. If the response output format is not the audio format, the smart controlling device 110 transmits a second control command to the second display device to switch the display power status of the second display device to the power-on status from the stand-by status. At the same time or after display power of the second display device is turned on, the smart controlling device 110 transmits response data to the second display device 920 to be output in response to the command data and controls the response data to be outputted via the display.

If the response data is outputted via the second display device 920, since the response for the command data is completed, the smart controlling device 110 can further control the display power status of the second display device 920. For example, when the response data has been outputted via the second display device 920 or the playback of the response data is terminated, if an additional command data (or command trigger) of the user is not received within a prescribed time, the smart controlling device 110 can control the display power status of the second display device 920 to be switched back to a previous status, i.e., the stand-by status or the power-off status. If the display power status of the second display device 920 is switched to the stand-by status, the smart controlling device 110 can transmit an additional control command to the second display device 920 to control the display to be power-on or power-off according to whether or not an additional voice command signal is received within a prescribed time.

Even where the first display device 910 is located within the predetermined range, the smart controlling device may select the second display device 920 so that the currently displayed content is not interrupted or blocked. Further, the smart controlling device may be able to select another display device more appropriate for a display of a response data based on a closer distance from the user or the smart controlling device, a gaze direction of the user, or a moving direction of the user.

FIG. 9*c* shows a situation where there is no display device outputting content and only a single display device 930 is present within the predetermined threshold range. In this case, as mentioned in the foregoing description, the smart controlling device 110 detects the display device 930 according to a command trigger and controls the display device 930 to be switched to a stand-by mode according to a display power status of the detected display device 930 and controls data to be displayed at the display device 930 according to analysis of command data.

If at least one display device is not detected within a predetermined range (e.g., first range) on the basis of a user (speaker), the smart controlling device 110 can perform an additional operation depending on a configuration. For example, the additional operation may correspond to repeatedly attempting to detect a display device up to a maximum number of attempts or continuously attempting to detect without a maximum number of attempts until at least one display device is detected within the first range. In another embodiment, the first range may be expanded to a greater second range or an even greater third range to detect a display device.

Even where at least one display device is detected within the range, the additional operation may also include where a display power status of the display device does not respond to a stand-by mode control or a turn-on control or a case that it is difficult to execute the stand-by mode control or the power-on control signal. In some cases, if a valid display device is not detected within the predetermined range or an expanded range, the smart controlling device may be configured to output the response data at the smart controlling device, such as via the display or an audio speaker, or control a different type of device to output the response data. This may include changing or converting the output format of the response data to a format which can be output by the smart controlling device or by the different type of device, such as converting to the audio output format. If the smart controlling device 110 is equipped with a display, the output format can also be outputted via the display of the smart controlling device. In this case, an indication may be output that the format has been modified, such as an audio indicator.

Figure 10:
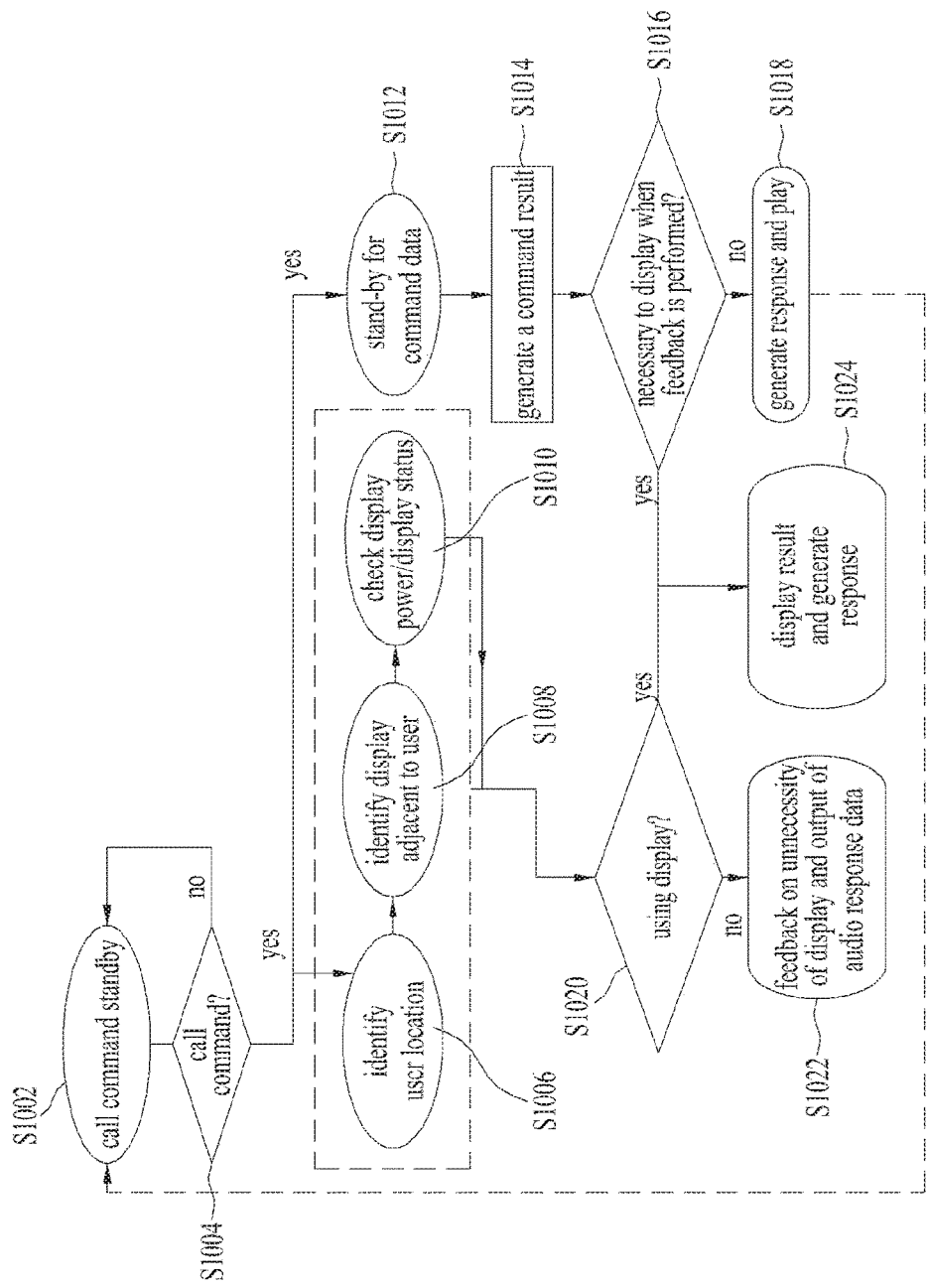
FIG. 10 is a flowchart for explaining a method of outputting data of a smart controlling device according to a different embodiment of the present disclosure.

FIG. 10 is a flowchart depicting a method of outputting data of a smart controlling device according to another embodiment of the present invention.

In particular, FIG. 10 shows a method of delivering a command trigger and response data of a command data, i.e., feedback.

The smart controlling device 110 receives a prescribed signal input in a command trigger stand-by state [S1002]. In this case, the prescribed signal can be received in various types including a voice of a speaker (user), a text input by the user, a motion gesture of the user, and the like. For clarity, assume that the prescribed signal is received as a voice input.

If the prescribed signal is received, the smart controlling device 110 determines whether or not the inputted signal corresponds to a command trigger [S1004].

If the inputted signal corresponds to a command trigger, the smart controlling device 110 is switched to a general command stand-by state to receive a command data [S1012] or performs an operation according to the command data. And part of or all of S1006, S1008, and S1010, are performed simultaneously with S1012.

In this case, the operation detects a location of a user who has input the prescribed signal [S1006] and detects a neighboring display device such as a TV, a mobile terminal, a tablet, a refrigerator, or the like, including a display based on the detected location of the user [S1008]. After the step S1008 is performed, the smart controlling device 110 determines a display status or a display power status of the detected display device [S1010].

After the step S1010 is performed, the smart controlling device 110 receives and analyzes a command data of the user which is inputted after the command trigger to determine an output format of a response. The smart controlling device 110 determines whether or not the output format for the response data corresponds to an audio output format. In particular, the smart controlling device 110 determines whether a display is required for the response data [S1020].

If the output format of the response data is an audio output for which a display is not necessary, the smart controlling device 110 cause output of the audio response data [S1022] when the feedback is not performed. In particular, the smart controlling device 110 may transmit a control command to cause a neighboring display device to be turned off and outputs the response data in the audio format. In this case, the audio format can be directly outputted by the smart controlling device 110 or can be outputted by an external audio output device which is selected by a scheme similar to the operation [S1010]. For example, the smart controlling device may detect an audio output device located within a predetermined range and determine whether or not the detected audio output device is able to output audio. Subsequently, the smart controlling device may cause the detected audio output device to output response data after being switched to a stand-by mode or turn-on state. The smart controller may similarly cause the detected audio output device to be switched back to a turn-off state after outputting the response data.

Meanwhile, referring back to S1020, if the output format of the response data requires output of the response data on a display rather than an audio output, the smart controlling device 110 turns on the power of the display of the neighboring display device, which is selected according to the operation [S1008], and transmits a control command to cause the display device to output the response data [S1024].

Besides, in case of the step S1012, a command data is received and analyzed in a general command stand-by state to generate a command result, i.e., a response data [S1014].

When the generated response data is output according to a command spoken by the user (i.e., command data), the smart controlling device 110 determines whether to use the display [S1016]. If it is necessary to use the display for the response data output, as mentioned in the foregoing description, the smart controlling device 110 performs the step [S1024] using the neighboring display device. In this case, if the operation [S1010] according to the present invention is not performed yet, the smart controlling device 110 may perform the steps S1006 to S1010.

However, after the step S1016 is performed, if it is not necessary to use the display for the feedback, the smart controlling device outputs the generated response data in an audio output form [S1018].

FIGS. 11 to 14 are diagrams depicting various examples of a smart controlling device according an embodiment of the present invention.

Referring to FIG. 11a, if a voice input including a command trigger and a command signal, such as "Alice, what is a Wednesday/Thursday soap opera on TV tonight?" is received, the smart controlling device 110 analyzes the voice input. As a result, if it is determined that an output format of response data does not require a display of a display device, as shown in FIG. 11b, the smart controlling device can directly output audio feedback in response to the command data, for example, it may output the answer "Shin Saimdang starts at 9:50 on SBC" as audio only.

Figure 12:
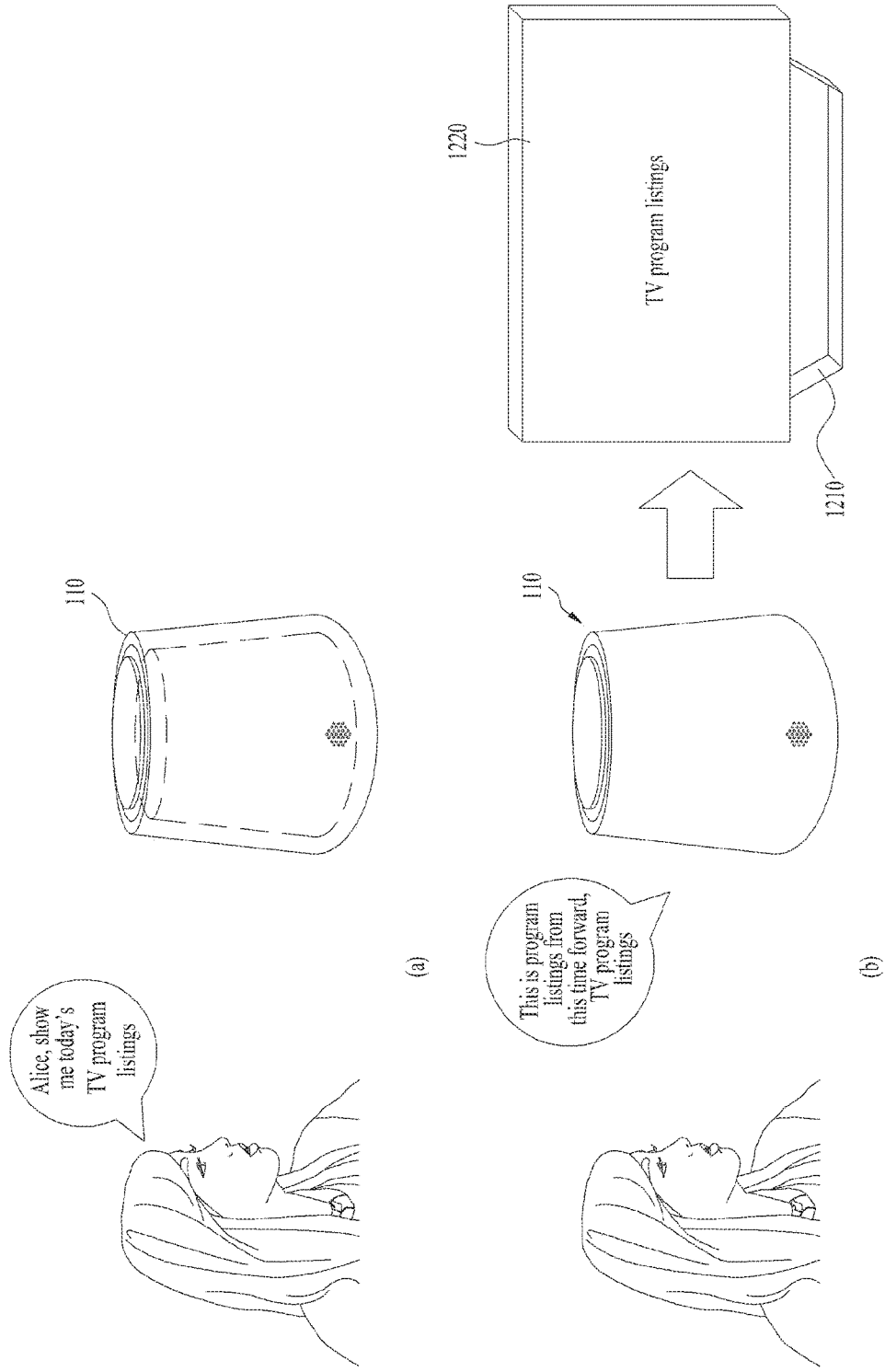
Figure 13:
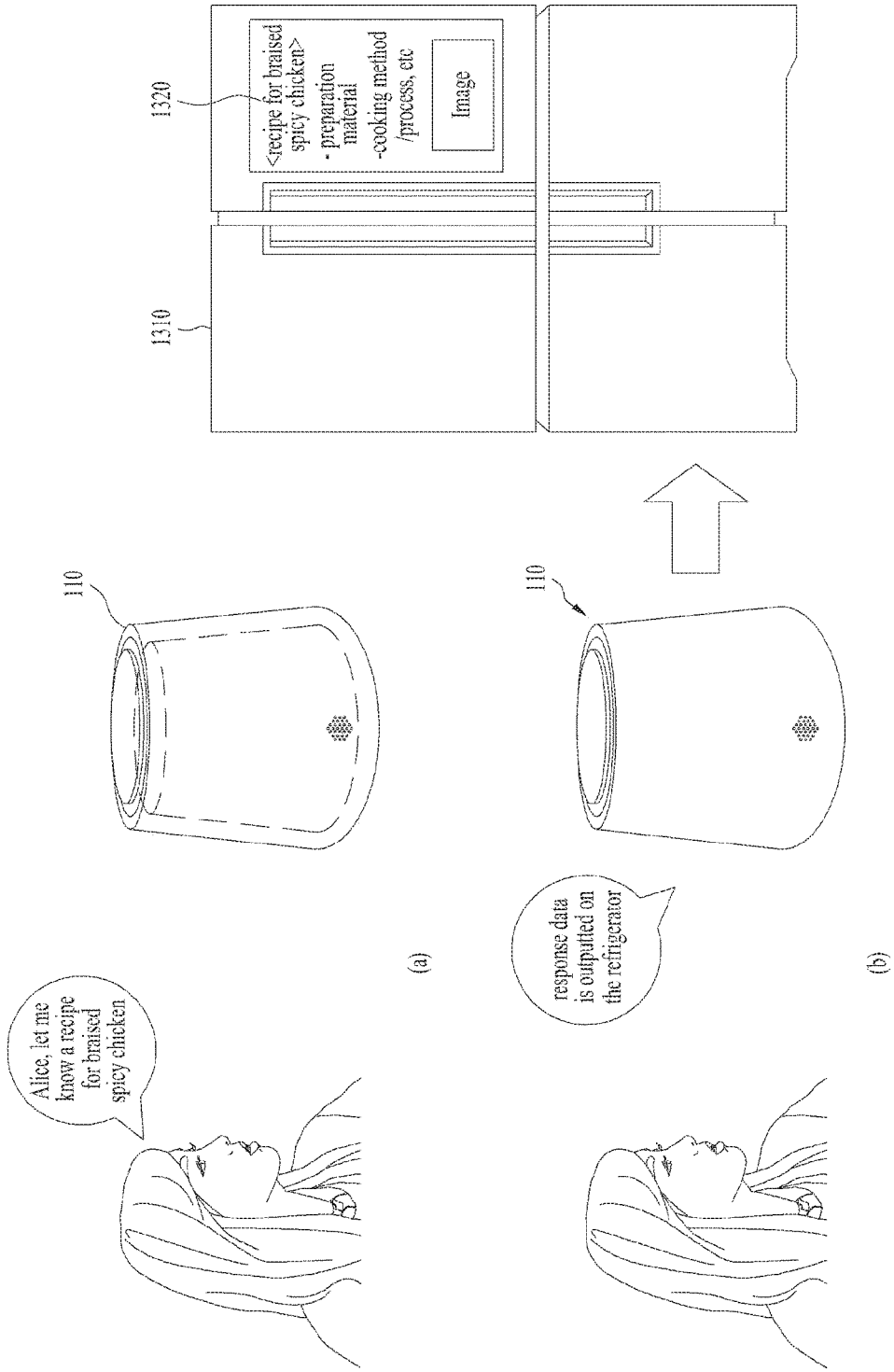
Figure 14:
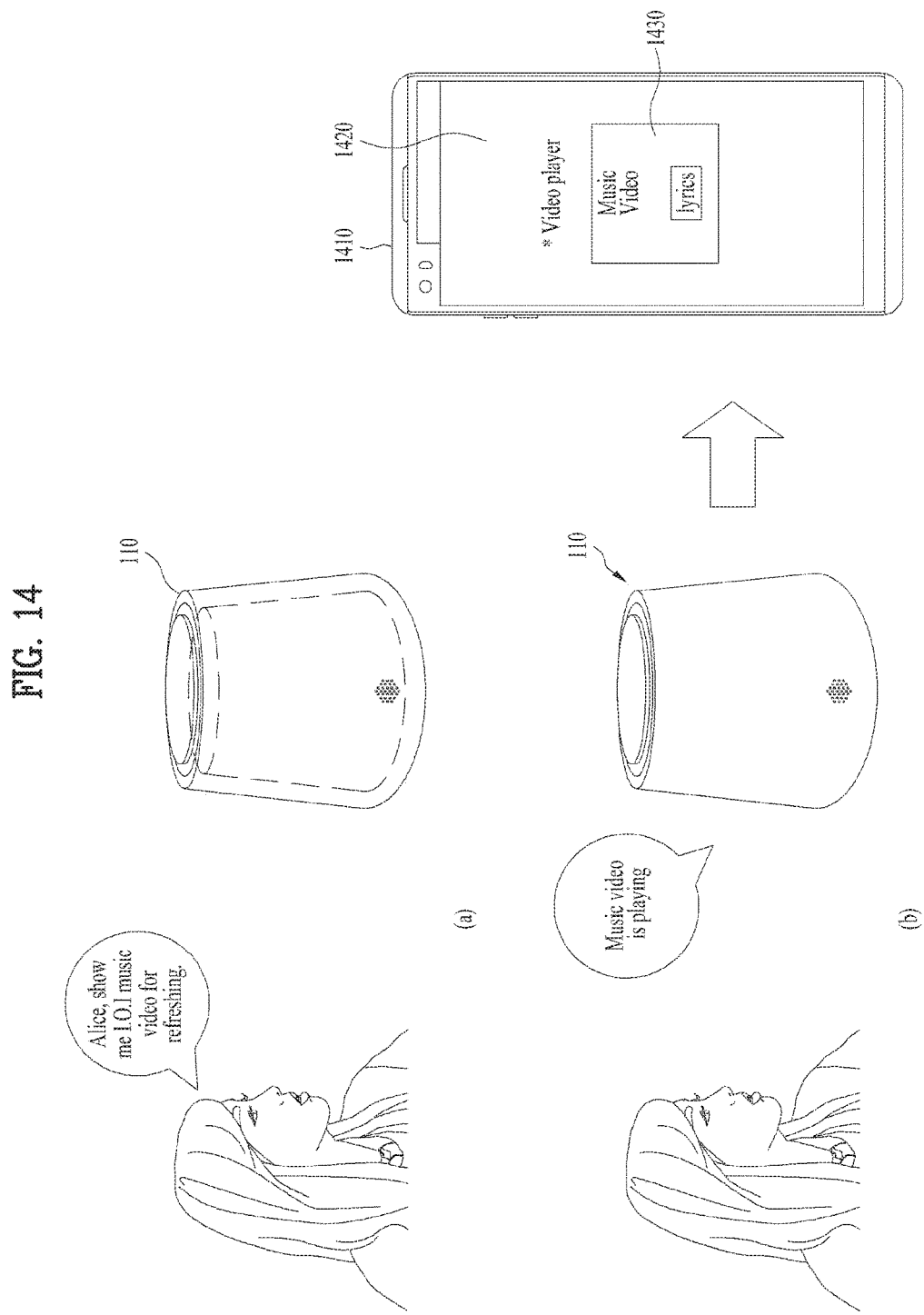

FIGS. 12 to 14 show examples of response data output via a display rather than the audio output format. In this case, a digital TV, a refrigerator equipped with a display, and a tablet PC are shown in FIG. 12, FIG. 13, and FIG. 14, respectively, as a display device.

Referring to FIG. 12a, the smart controlling device 110 receives a voice input such as "Alice, show me today's TV program listings" which includes a command trigger and command data. The smart controlling device 110 may detect a location of the user based on the voice input and detect a neighboring display device based on the detected location of the user. The smart controlling device 110 determines a display power status of the detected neighboring display device. If the display power status of the neighboring display device is determined as an off status, the smart controlling device transmits a control command to the neighboring display device to change the display power status to a stand-by status.

While the detecting procedures and transmission of the control command are performed, or after the detecting procedures and the transmission of the control command are performed, the smart controlling device 110 analyzes an input signal, i.e., a command data, which is received after or with the command trigger. The smart controlling device 110 determines whether to use the neighboring display device (i.e., output format of a response data) according to a result of the analysis. If it is determined that the neighboring display device is not to be used, the smart controlling device 110 can transmit a control command to the neighboring display device to make power of the neighboring display device to be turned off. In this case, the smart controlling device 110 can transmit the turn-off control command to all detected display devices. In other embodiments, the smart controlling device 110 may not transmit the turn-off control command to a display device in which an application is currently executed or content is currently being displayed to save power consumption and to prevent interrupting current usage.

On the contrary, if it is determined to use the neighboring display device, in one embodiment, the smart controlling device 110 can control TV program listings 1220 to be outputted on a screen of the neighboring display device 1210. In this case, for example, if the neighboring display device stores or has access to TV program listings data, the smart controlling device 110 can transmit a control command for displaying the TV program listings data only. In other embodiments, the smart controlling device 110 may receive the TV program listings data from an external server and provide the TV program listings data to the neighboring display device, or cause the TV program listings data to be transmitted directly to the display device.

As shown in FIG. 12b, when the TV program listings is outputted via the display device 1210 as a response data, an audio indicator may be output to explain the information being output, for example, "These are the program listings from this time forward." Since it may be difficult for a user to know which display device is outputting the response data, the audio indicator may be output from the display device before the TV program listings is output on the display device 1210 to make the user aware of the display device 1210 that is going to output the response data.

FIG. 13 shows an example of using a refrigerator equipped with a display. For example, as mentioned in the foregoing description, selection of a neighboring display device may not be based only on a location of the user or a direction of the user, but the selection may also be based on an attribute of the command data or an attribute of a response data, and the like.

Referring to FIG. 13a for example, if a voice input such as "Alice, give me a recipe for braised spicy chicken" is received from a user, the smart controlling device 110 selects a neighboring display device based on the command trigger and the command data, and the type of response data required (recipe for braised spicy chicken-preparation material, cooking method/process, etc.). In this case, the response data can include not only text of a recipe, but also other data including an image, a video, and the like, related to the recipe. Since the command data or the response data is determined to be related to food or cooking recipes, a display device of a refrigerator may be selected. This may be the case even where other display devices are located closer to the smart controlling device. The smart controlling device may accordingly take all factors of each display device into consideration and prioritize them, including distance, purpose, type, functionality, and the like. As mentioned in the foregoing description, when the response data is outputted via the display device, it may also be able to output audio indicators ("The recipe is displayed on the refrigerator").

In the foregoing description, the command trigger can be recognized as a starting point or initiating term for detecting a nearby display device and controlling a display power status of the display device. For example, when a signal is inputted to the smart controlling device 110, the smart controlling device can be configured to recognize the signal as a valid input for the smart controlling device 110 only when a command trigger is included in the signal. In other cases, when a user inputs voice commands to the smart controlling device 110, the user may input a command trigger in addition to the command data at the same time, or within a short time thereafter, instead of separately sending the command trigger and the command data. In this case, if an input signal including a command trigger is received from the user, the smart controlling device 110 determines the input signal as a valid user input and detects a location of the user.

When a display device is selected based on the location of the user, the display device can also be selected by analyzing a command data included in the input signal. In other words, as shown in FIG. 13, if an attribute of a command data is recognized as related to food or cooking, the smart controlling device is able to prevent an error and increase efficiency in detecting display devices. This is because, if an intention of a user relates to food or cooking, it may be preferable to use a display device related to food or the kitchen instead of receiving the response data on a TV in another area. In this case, the smart controlling device 110 may change the predetermined range for detecting display devices or expand the predetermined range. Or, it may base the selection of display devices on factors other than distance.

Referring to FIG. 14a, if an input signal such as "Alice, show me I.O.I music video for refreshing" is received from a user, the smart controlling device 110 selects a neighboring display device (tablet PC 1410) according to a prescribed criterion and controls a music video data to be outputted via the selected display device as response data. In this case, the tablet PC 1410 executes an application, i.e., a video player, corresponding to the response data according to the control of the smart controlling device 110 and outputs the response data (including lyrics in some embodiments) via the executed music player.

In FIG. 14, the smart controlling device may select the display device based on a display power status, a resource, and the like, in addition to the criterion for selecting the display device. For example, when a format of the input signal received from the user and/or a format of the response signal corresponds to a specific format, the smart controlling device will attempt to select a display device capable of receiving, processing, or playing back the specific format. Hence, when the smart controlling device 110 detects or selects a display device or a neighboring display device, the smart controlling device may refer to data capabilities of a resource in advance. When provided with more than one resource with sufficient capabilities, the smart controlling device may further consider other factors, including a usage pattern learned from a user, a resolution of a data, and the like, as well as the aforementioned distance, directivity, attributes, and the like.

Figure 15:
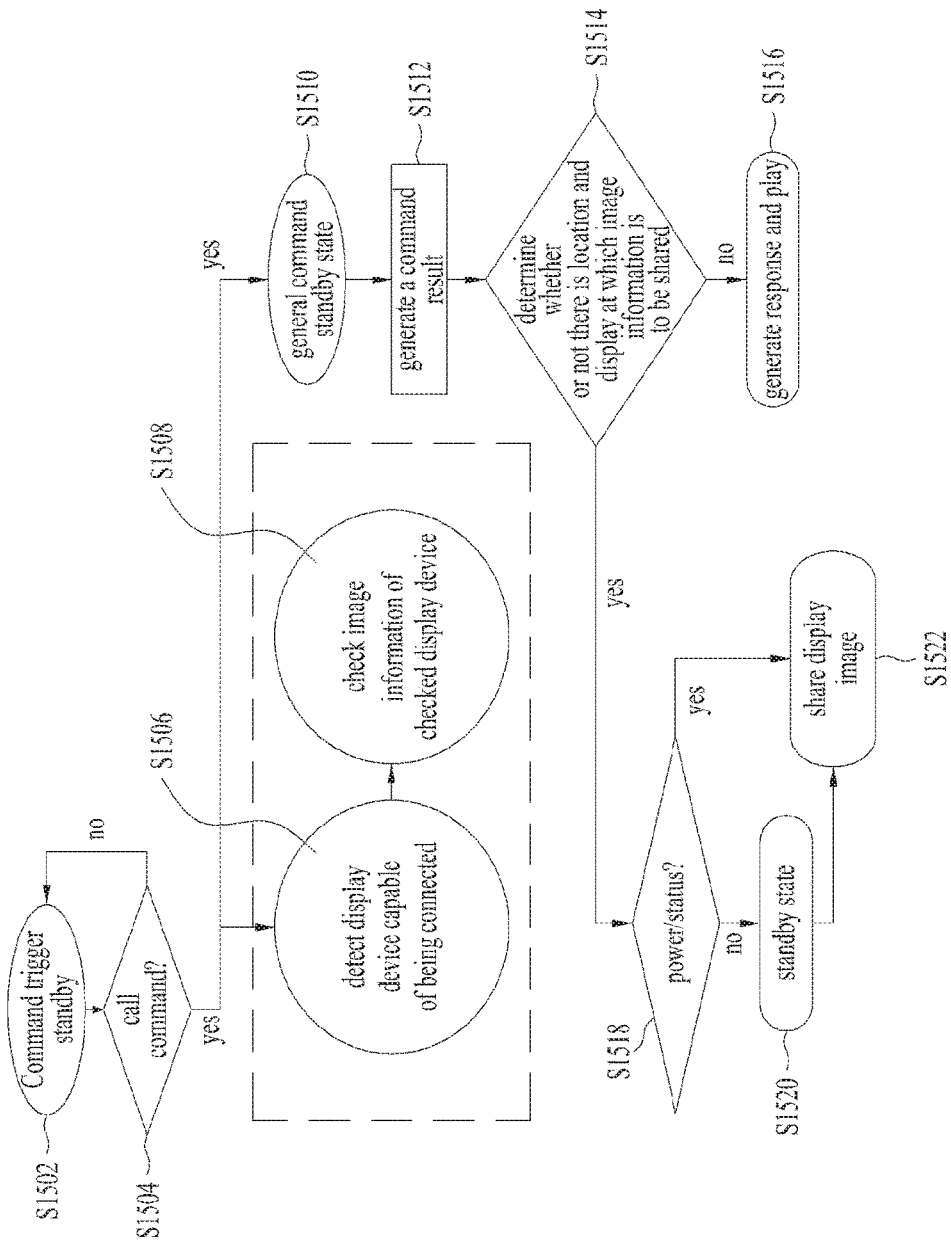
FIG. 15 is a flowchart for explaining a method of outputting data of a smart controlling device according to a further different embodiment of the present disclosure.

FIG. 15 is a flowchart depicting a method of outputting data of a smart controlling device according to a further embodiment of the present invention.

In particular, FIG. 15 relates to providing image information. When power of the smart controlling device 110 is initially turned on, it may check basic information on a display device in advance and use the basic information.

The smart controlling device 110 receives a prescribed signal in a command trigger stand-by state [S1502]. In this case, the prescribed signal can be received in various types including a voice, a text, a motion gesture, and the like. For the purposes of the example, we assume that the prescribed signal corresponds to a voice signal.

If the prescribed signal is received, the smart controlling device 110 determines whether or not the inputted signal corresponds to command trigger or whether or not the inputted signal is included in a command trigger [S1504].

If the inputted signal corresponds to a command trigger or is included in the command trigger, the smart controlling device 110 performs operations according to the present invention.

In this case, the operations include detecting a location of a user who has input the prescribed signal and detect a neighboring display device such as a TV, a mobile terminal, a tablet, a refrigerator including a display device, and the like, based on the detected location of the user. In particular, the smart controlling device detects a display device capable of being connected with the smart controlling device. [S1506]. The smart controlling device 110 may further check image information of the detected display device [S1508]. S1506 and S1510 are performed simultaneously. Specifically, the image information is the image information playing on the screen of the detected display device. If the detected display device displays movie program, the image information may be movie program image information. So the smart controlling device 110 may check what is playing in the detected display device and obtain movie program image information from the detected display device.

The smart controlling device 110 may receive and analyzes command data while in a general command stand-by state [S1510] and generates a command result, i.e., a response data [S1512]. In this example, the generated response data may correspond to image information to be output in response to the command data.

The smart controlling device 110 determines whether or not there is a a display device at which image information corresponding to the response data is to be output [S1514]. If there exists a display device at which the image information can be output, the smart controlling device determines a power status of the display device [S1518]. The smart controlling device causes the power of the display device to be switched to a stand-by state [S1520] when the smart controlling device determine that it is not power status but standby state and causes the image information to be output via the display device [S1522].

If no display device is detected at which the image information can be output, the smart controlling device may output the response data in an audio output format [S1516]. The smart controlling device may be configured to convert the response data to audio output information, such as a description of the response data using image recognition, facial recognition, and the like.

Figure 16:
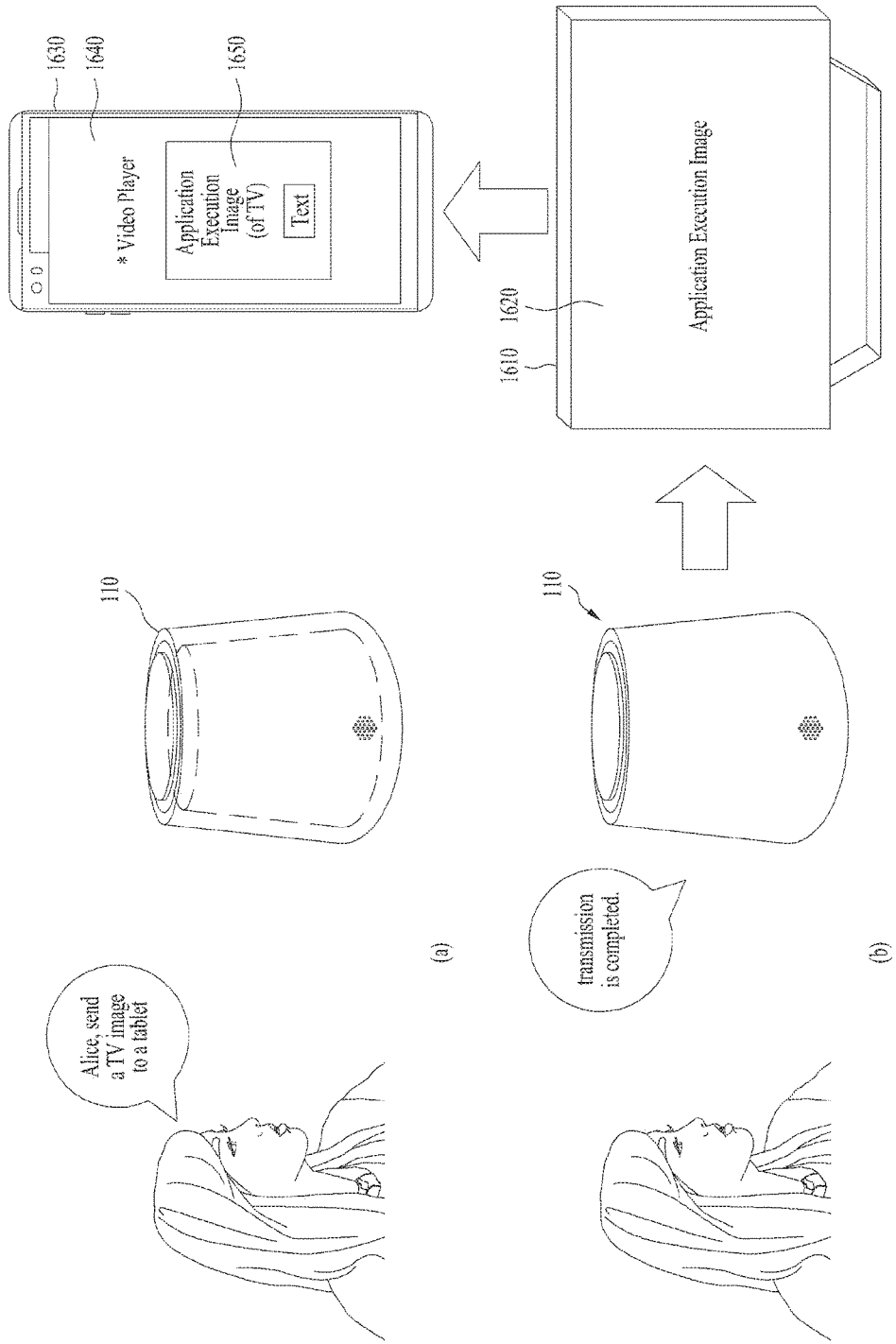
FIG. 16 is a diagram for explaining a scenario including image information of a smart controlling device according to the present disclosure.

FIG. 16 is an illustration of another embodiment of a smart controlling device according to the present invention.

Referring to FIG. 16a, if a signal such as "Alice, send a TV image to a tablet" is received from a user, the smart controlling device 110 detects both a TV 1610 and a tablet 1630.

As shown in FIG. 16b, the smart controlling device 110 transmits a control command to the TV 1610 to generate a screen shot image of a screen 1620 of the TV 1610 to be transmitted to the detected tablet PC 1630. In other embodiments, the TV may transmit currently displayed information such that the TV screen is continuously mirrored on the tablet PC. If necessary, control commands for transmitting the screen shot image to the tablet PC and controlling playback of the transmitted image can be separately performed. If the screen shot image 1620 is received from the TV 1610, the tablet PC 1630 controls an appropriate application (e.g., video or image player application) to be executed according to the screen shot image for display or playback of the screen shot image 1620 using the executed video player application 1640.

Figure 17:
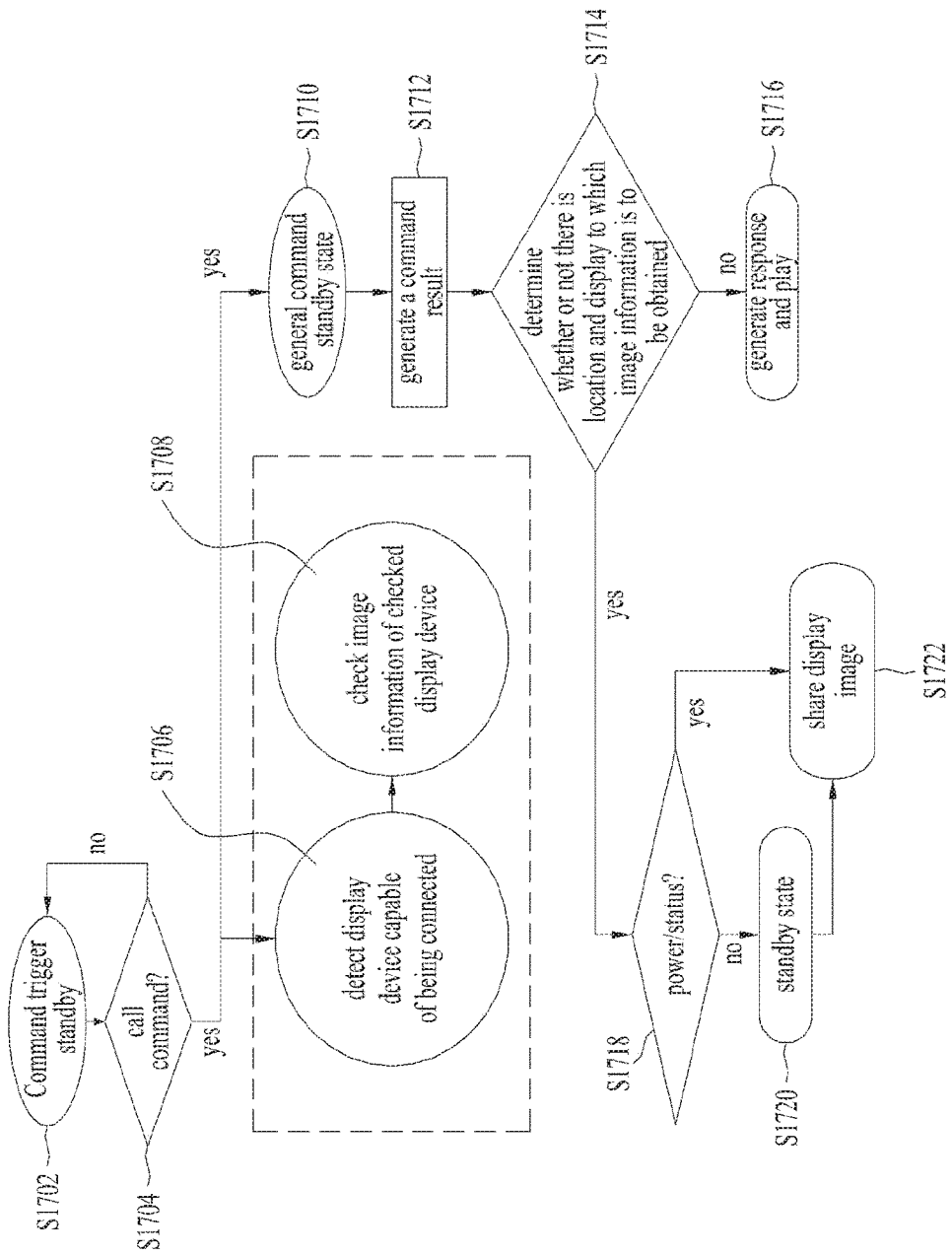
FIG. 17 is a flowchart for explaining a method of outputting data of a smart controlling device according to a further different embodiment of the present disclosure.

FIG. 17 is a flowchart fdepicting a method of outputting data of a smart controlling device according to another embodiment of the present invention.

FIG. 17 illustrates a case of obtaining image information from a different device.

The smart controlling device 110 receives a prescribed signal in a command trigger stand-by state [S1702]. In this case, the prescribed signal can be received in various types including a voice, a text, a motion gesture, and the like. For this example, we assume that the prescribed signal corresponds to a voice signal.

If the prescribed signal is received, the smart controlling device 110 determines whether or not the inputted signal corresponds to a command trigger or whether or not the inputted signal is included in a command trigger [S1704].

If the inputted signal corresponds to the command trigger or is included in the command trigger, the smart controlling device 110 performs operations according to the present invention. And, S1706 and S1710 are performed simultaneously.

In this case, the operations includes detecting a location of a user who has transmitted the prescribed signal and detecting a neighboring display device such as a TV, a mobile terminal, a tablet, a refrigerator including a display device, and the like, based on the detected location of the user. In particular, the smart controlling device detects a display device capable of being connected with the smart controlling device. [S1706]. The smart controlling device 110 further checks image information of the detected display device [S1708]. Specifically, the image information is the image information playing on the screen of the detected display device. If the detected display device displays News program, the image information may be News program image information. So the smart controlling device 110 may check what is playing in the detected display device and obtain News program image information from the detected display device.

The smart controlling device 110 receives and analyzes a command data in a general command stand-by state [S1710] and generates a command result, i.e., a response data [S1712].

The smart controlling device 110 determines whether or not there is a neighboring display device to which the image information is to be obtained [S1714]. A display device can be a table PC. When the smart controlling device feedbacks the response data, if there exists the location and/or the display to which the image information is to be obtained, the smart controlling device determines a power status of the display device [S1718]. The smart controlling device controls display power to be switched to a stand-by state [S1720] when the controlling device determines that it is not a power status but a stand-by state [S1718] and shares an image via the display device [S1722].

If there is no location and/or a display at which the image information is to be shared, the smart controlling device may generate response and play. Specifically, the smart controlling device may output the response data in an audio output format [S1716].

FIG. 18 is a diagram depicting a scenario including image information of a smart controlling device according to another embodiment of the present invention.

Referring to FIG. 18a, if a signal such as "Alice, send a tablet PC image to a TV" is received from a user, the smart controlling device 110 detects both a PC 1810 and a TV 1840.

As shown in FIG. 18b, the smart controlling device 110 transmits a control command to the tablet PC 1810 to generate a screen shot image outputted on a screen 1820 of the detected tablet PC 1810 and to transmit the screen shot image to the detected TV 1840. In other embodiments, the tablet PC may transmit currently displayed information such that the tablet PC screen is continuously mirrored on the detected TV. If necessary, control commands for transmitting the screen shot image to the detected TV and for controlling playback can be separately transmitted to the TV 1840 and the tablet PC. If the screen shot image 1830 is received from the tablet PC 1810, the TV 1840 controls an appropriate application to be executed according to the screen shot image and controls the image to be displayed. Meanwhile, if an application was being executed at the TV 1840, the screen shot image 1830 can be outputted in various forms including a full screen, a split screen, picture-in-picture, and the like.

As discussed, in some embodiments, if a command trigger is received, a smart controlling device 110 can determine whether or not a user is moving. If movement of the user is detected, data on the movement of the user is obtained to detect a neighboring display device and determine the one or more display devices to be selected according to the movement data. In this case, the data on the movement of the user can include a movement speed of the user, a moving direction of the user, and the like.

For example, the smart controlling device 110 may select one or more display devices based on the moving speed and the moving direction of the user and may be able to control the selected display devices to output response data to correspond to the movement of the user after power of all of a plurality of the display devices are standby and/or turned on. Accordingly, the response data may be partially displayed at a first display device, and then the remainder may be displayed at a second display device if the user is detected to be moving from the first display device toward the second display device. Alternatively, the response data may be displayed in a directional manner on one or more of the display devices, such that the response data is displayed to be sliding in one direction or another according to detected movement of the user. In another embodiment, the smart controlling device 110 detects a gaze direction of a user using cameras, an eye-tracking sensor, body position sensor, or the like, and may select and control a display device with reference to the detected gaze direction of the user.

According to at least one of the aforementioned embodiments of the present invention, it may be able to recognize an input signal and analyze the recognized input signal based on AI to correspond to the input signal. Even if the input signal is not a voice input and an output signal is not in audio form, the smart controlling device may be able to easily and quickly process the signals. It may be able to provide an adaptive response using a display of a different neighboring device based on environmental factors, user status, location, movement direction, response data format, and the like. By doing so, it may be able to improve functionality of the smart controlling device as well as functionality of the display devices, and further satisfy an intention of the speaker and increase user convenience.

Meanwhile, the present invention can be implemented with a code readable by a computer in a recording media in which a program is recorded. The recording media readable by the computer may include all kinds of recording devices for storing data capable of being read by the computer system. The examples of the recording media readable by the computer may include a HDD (hard disk drive), an SSD (solid state disk), a ROM, a RAM, a CD-ROM, a magnetic tape, a floppy disc, an optical data storing device and the like. And, the computer may include a controller 180 of a terminal. While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A smart controlling device, comprising:
a receiver configured to receive an input comprising a command trigger;
a communication interface configured to transceive data with an external device; and
a controller configured to:
detect one or more external display devices;
select a display device of the detected one or more external display devices;
cause a power status of the selected display device to be changed to a first state; and
cause a response data corresponding to a first command data received after the command trigger to be output on a display of the selected display device,
wherein the controller is further configured to:
detect the power status of the display of the selected display device; and
when the power status of the display of the selected display device corresponds to a power-off status, cause the communication interface to transmit a control command to change the power status of the display of the selected display device from the power-off status to a stand-by status.

2. The smart controlling device of claim 1, wherein the controller is further configured to generate the response data based on the first command data.

3. The smart controlling device of claim 1, wherein the received input corresponds to a first voice input and the controller is further configured to obtain a first location of a speaker of the first voice input based on the received input.

4. The smart controlling device of claim 3, wherein the controller is further configured to select the selected display device from the detected one or more external display devices based on at least the first location of the speaker.

5. The smart controlling device of claim 4, wherein the controller is further configured to select the selected display device which is located closest to the first location of the speaker among the detected one or more external display devices.

6. The smart controlling device of claim 1, wherein the controller is further configured to select the selected display device based on an attribute of the command trigger, an attribute of the first command data, an attribute of the response data, a location of a source of the received input, a direction of the source of the received input, an attribute of the selected display device, a display size of the selected display device, or a current power status of the selected display device.

7. The smart controlling device of claim 1, wherein the controller is further configured to transmit a control command to change the power status of the selected display device from the first state to a second state when the response data is required to be output via a display.

8. The smart controlling device of claim 7, wherein the controller is further configured to transmit the response data to the selected display device for displaying the response data via a display of the selected display device.

9. The smart controlling device of claim 1, wherein the controller is further configured to transmit a control command to change the power status of the selected display device from the first state to a previous state when the response data is not required to be output via a display.

10. The smart controlling device of claim 4, wherein the controller is further configured to:
when at least one external display device is not detected within a first range based on the first location of the speaker, detect the at least one external display device by expanding the first range to a second range.

11. The smart controlling device of claim 1, wherein the controller is further configured to transmit a control command to the selected display device to cancel changing the power status of the selected display device when the first command data is not received within a threshold period of time following the command trigger.

12. The smart controlling device of claim 3, wherein the controller is further configured to generate second response data corresponding to second command data when the second command data is received with a threshold period of time after the first command data is received or when the second command data is received within the threshold period of time after the response data corresponding to the first command data is output at the selected display device.

13. The smart controlling device of claim 12, wherein the second command data corresponds to a second voice input and controller is further configured to:
obtain a second location of a speaker of the second voice input; and
cause the generated second response data to be output at the selected display device when the second location of the speaker is within a threshold distance from the first location of the speaker.

14. The smart controlling device of claim 12, wherein the second command data corresponds to a second voice input and controller is further configured to:
obtain a second location of a speaker of the second voice input;
change the power status of the selected display device from the first state to a previous state when the second location of the speaker is not within a threshold distance from the first location of the speaker;
select another display device from the one or more detected external display devices; and
cause the generated second response data to be output at the selected another display device.

15. The smart controlling device of claim 1, wherein at least two external display devices are detected and the controller is further configured to select the selected display device based on the first command data and a functionality of the selected display device.

16. The smart controlling device of claim 1, wherein the command trigger corresponds to a voice input, a text input, or a motion gesture.

17. The smart controlling device of claim 1, further comprising an output unit, wherein the controller is further configured to output an indicator via the output unit to indicate that the response data is being output at the selected display device.

18. A method of controlling a smart controlling device, the method comprising:
receiving, via a receiver, an input comprising a command trigger;
detecting a location of a source of the received input;
detecting one or more external display devices based on the detected location;
selecting a display device from the detected one or more external display devices;
causing a power status of the selected display device to be changed to a first state; and
causing a response data corresponding to a first command data received after the command trigger to be output on a display of the selected display device,
wherein the method further comprises:
detecting the power status of the display of the selected display device; and
when the power status of the display of the selected display device corresponds to a power-off status, transmitting a control command to change the power status of the display of the selected display device from the power-off status to a stand-by status.

* * * * *